US012584739B2

(12) United States Patent
Sanchez Ruelas et al.

(10) Patent No.: US 12,584,739 B2
(45) Date of Patent: Mar. 24, 2026

(54) TARGET AND PLUMBING SYSTEM FOR TRANSFERRING A POINT OF INTEREST TO A JOBSITE SURFACE

(71) Applicant: Hilti Aktiengesellschaft, Schaan (LI)

(72) Inventors: Jafet German Sanchez Ruelas, Altstaetten (CH); Marco Kerschbaumer, Woringen (DE); Thomas Roller, Dornstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 408 days.

(21) Appl. No.: 18/254,545

(22) PCT Filed: Nov. 10, 2021

(86) PCT No.: PCT/EP2021/081205
§ 371 (c)(1),
(2) Date: May 25, 2023

(87) PCT Pub. No.: WO2022/111995
PCT Pub. Date: Jun. 2, 2022

(65) Prior Publication Data
US 2024/0011773 A1 Jan. 11, 2024

(30) Foreign Application Priority Data

Nov. 30, 2020 (EP) .................................... 20210569

(51) Int. Cl.
*G01C 15/08* (2006.01)
*G01C 15/10* (2006.01)
(52) U.S. Cl.
CPC ........... *G01C 15/08* (2013.01); *G01C 15/105* (2013.01)
(58) Field of Classification Search
CPC .... G01C 15/006; G01C 15/08; G01C 15/105; G01C 15/06; G01C 3/02; G01C 3/08;
(Continued)

(56) References Cited

U.S. PATENT DOCUMENTS

| | | | | |
|---|---|---|---|---|
| 5,182,863 A | * | 2/1993 | Rando | ................... G01B 11/26 |
| | | | | 33/290 |
| 6,202,313 B1 | | 3/2001 | Yamashita | |

(Continued)

FOREIGN PATENT DOCUMENTS

| | | | | |
|---|---|---|---|---|
| CN | 202938827 U | 5/2013 | | |
| EP | 2053354 A1 | * | 4/2009 | ........... G01C 15/004 |

(Continued)

OTHER PUBLICATIONS

PCT/EP2021/081205, International Search Report dated Jan. 28, 2022 (Two (2) pages).

(Continued)

*Primary Examiner* — John E Breene
*Assistant Examiner* — Daniel M Quinn
(74) *Attorney, Agent, or Firm* — Crowell & Moring LLP

(57) ABSTRACT

A target and plumbing system includes a reflective target which has a reflective surface, a self-leveling plumb line laser pointer which emits a plumb line laser beam having a pathway that is in a vertical direction where the vertical direction is substantially parallel to a gravitational direction, a holding device which includes a first holding element that assists in holding the reflective target and a second holding element that assists in holding the plumb line laser pointer, and a positioning device which includes a first positioning element and a second positioning element where the holding device is connected to the first positioning element and the first positioning element is movable with respect to the second positioning element. The second positioning element is a platform including an open space that defines a horizontal two-dimensional area where the first positioning element is movable with respect to the open space.

12 Claims, 16 Drawing Sheets

(58) Field of Classification Search
CPC .... G01C 15/004; G01C 15/002; G01C 25/00;
G01S 7/4813; G01S 17/42; G01S 17/74
USPC .......... 33/227, 228, 280, 286, 290, 392, 666
See application file for complete search history.

(56) References Cited

U.S. PATENT DOCUMENTS

| | | | | |
|---|---|---|---|---|
| 6,763,596 | B1 * | 7/2004 | Puri ..................... | G01C 15/105 |
| | | | | 33/286 |
| 6,774,839 | B2 * | 8/2004 | Talbot ..................... | G01S 17/86 |
| | | | | 342/357.31 |
| 8,087,176 | B1 * | 1/2012 | Hayes ................. | G01C 15/004 |
| | | | | 33/1 G |
| 8,745,884 | B2 * | 6/2014 | Hayes ................. | G01C 15/006 |
| | | | | 33/1 G |
| 9,746,324 | B1 | 8/2017 | Hamel et al. | |
| 9,776,320 | B2 | 10/2017 | Nishita | |
| 10,145,676 | B2 * | 12/2018 | Hayes ..................... | G01S 17/89 |
| 10,690,497 | B2 * | 6/2020 | Nagashima ............ | G01C 15/08 |
| 10,962,349 | B2 * | 3/2021 | Roller ..................... | G01S 17/42 |
| 11,255,663 | B2 * | 2/2022 | Binder ..................... | G01S 15/08 |
| 2011/0043515 | A1 * | 2/2011 | Stathis ................... | G05D 1/027 |
| | | | | 434/118 |
| 2012/0010847 | A1 | 1/2012 | Hamel et al. | |
| 2013/0324275 | A1 * | 12/2013 | Kuta .................. | A63B 69/3685 |
| | | | | 473/409 |
| 2016/0202058 | A1 | 7/2016 | Nagashima et al. | |
| 2017/0314921 | A1 * | 11/2017 | Spaulding ............ | G01C 15/004 |
| 2018/0202805 | A1 * | 7/2018 | Unger ..................... | G01S 17/74 |
| 2018/0313641 | A1 * | 11/2018 | Roller .................... | G01D 11/24 |
| 2022/0099440 | A1 * | 3/2022 | Unger .................... | G01C 15/06 |
| 2024/0210173 | A1 * | 6/2024 | Sanchez Ruelas .... | G01C 15/08 |
| 2024/0255640 | A1 * | 8/2024 | Forster .................... | G01S 17/10 |

FOREIGN PATENT DOCUMENTS

| | | | | | |
|---|---|---|---|---|---|
| JP | | 11-281359 | A | 10/1999 | |
| JP | | 2000-199712 | A | 7/2000 | |
| JP | | 3134970 | B2 | 2/2001 | |
| JP | | 2001-227950 | A | 8/2001 | |
| JP | | 3134970 | U | 8/2007 | |
| JP | | 2016-130655 | A | 7/2016 | |
| JP | | 2019-2849 | A | 1/2019 | |
| WO | WO-2016031504 | A1 * | 3/2016 | ............ | G01C 15/02 |

OTHER PUBLICATIONS

U.S. Patent Application, "Target and Plumbing System for Transferring a Point of Interest on a Jobsite Surface", filed May 26, 2023, Inventor Jafet German Sanchez Ruelas et al.

* cited by examiner

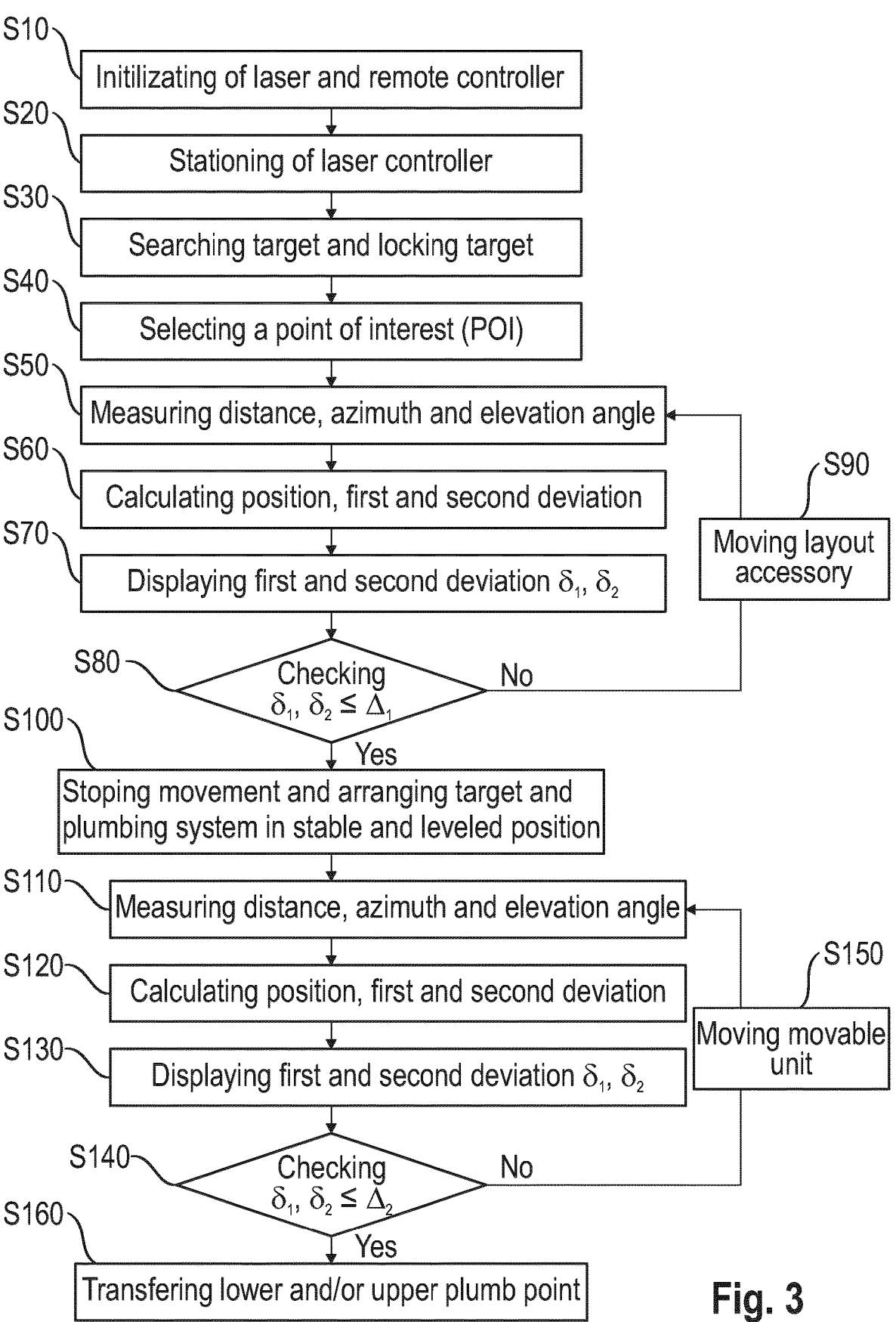

S10   Initilizating of laser and remote controller

S20   Stationing of laser controller

S30   Searching target and locking target

S40   Selecting a point of interest (POI)

S50   Measuring distance, azimuth and elevation angle

S60   Calculating position, first and second deviation

S70   Displaying first and second deviation $\delta_1$, $\delta_2$

S90   Moving layout accessory

S80   Checking $\delta_1$, $\delta_2 \leq \Delta_1$   No

Yes

S100   Stoping movement and arranging target and plumbing system in stable and leveled position S110   Measuring distance, azimuth and elevation angle S120   Calculating position, first and second deviation S150   Moving movable unit S130   Displaying first and second deviation $\delta_1$, $\delta_2$ S140   Checking $\delta_1$, $\delta_2 \leq \Delta_2$   No Yes S160   Transfering lower and/or upper plumb point

Fig. 3

TARGET AND PLUMBING SYSTEM FOR TRANSFERRING A POINT OF INTEREST TO A JOBSITE SURFACE

BACKGROUND AND SUMMARY OF THE INVENTION

The technology disclosed herein relates to layouting equipment that is intended to aid for example in laying out formwork, positions for excavation and fastening points on floors and ceilings, in the placement of wall tracks and/or wall structures for the construction of steel frame building and possibly residential structures and is particularly directed to a two-dimensional (2D) layout and point transfer system of the type which identifies points of interest and their coordinates, and transfers the identified points of interest to other jobsite surfaces, e.g., floor and/or ceiling, in a vertical direction.

Surveying instruments are known to assist in critical building and construction functions. For example, building foundations and retaining walls must be engineered and constructed within a certain degree of accuracy if they are to perform their desired functions in a proper manner and maintain structural integrity over time. Surveying instruments, such as total stations, robotic total stations, theodolites, laser beam measuring instruments, and similar instruments are often used to achieve the desired degree of accuracy and precision for these features and operations.

In U.S. Pat. No. 9,746,324 B1, a target and plumbing system for use with preexisting surveying instruments is provided, wherein the target and plumbing system is preferably adapted for use in combination with total stations and the target and plumbing system is provided for attachment to preexisting devices, such as poles, bipod devices or tripod devices. From U.S. Pat. No. 9,746,324 B1, a layout and point transfer system is known, which includes a laser controller preferably arranged on a tripod device, a remote controller, and the target and plumbing system attached to a movable and/or portable chassis.

The known target and plumbing system comprises a reflective target, e.g., a prism, a self-leveling plumb line laser pointer, a holding device that assists in holding the reflective target and the plumb line laser beam in their positions, and a positioning device. The positioning device comprises a first positioning element, which is designed as a first slider element that extends in a first translational direction, and a second positioning element, which is designed as a second slider element that extends in a second translational direction. The first translational direction is coplanar with and substantially perpendicular with the second translational direction and in a leveled position of the target and plumbing system, the first and second translational directions. The reflective target associated with the plumb line laser pointer is connected via the holding device to the first positioning element, the holding device being translatable with respect to the first slider element in the first translational direction, and the first slider element is connected to the second slider element and is translatable with respect to the second slider element in the second translational direction.

To layout a point of interest, the user moves the target and plumbing system instructed by the remote controller towards the selected point of interest. The difficulty in finding the point of interest is that the first and second direction, in which the deviations are calculated by the remote controller can change with a new current position of the target and plumbing system. The first direction is coplanar with the line-of-sight between the laser controller and the reflective target, and the second direction is substantially perpendicular with the first direction. By moving the target and plumbing system, the line-of-sight can change. Since the first direction is dependent on the orientation of the line-of-sight and the second direction is perpendicular to the first direction, both directions will change when the orientation of the line-of-sight changes. For the user, it could be difficult to align the first and second direction with the first and second translational direction of the positioning device. This process could be exhaustive and time consuming for the user.

As a result, there is a need for a target and plumbing system that assists the user in rapid and accurate layouting and transferring of points of interest vertically on a jobsite surface, which may be a floor and/or a ceiling.

The target and plumbing system is characterized in that the second positioning element is designed as platform including an open space that defines a horizontal two-dimensional area, wherein the first positioning element is movable with respect to the open space. The design of the first and second positioning element allows that the first positioning element can be translated in any horizontal translational direction inside the open space. The size and shape of the open space defines the 2D area in which the first positioning element can be translated with respect to the second positioning element.

The target and plumbing system according to the invention allows a fine positioning of both the reflective target and the plumb line laser pointer in any horizontal translational direction inside the open space; there are no restrictions to a first translational direction and a second translational direction that is perpendicular to the first translational direction. Without any restriction to the direction of positioning inside the open space, the target and plumbing system can reduce the time that is necessary to find a point of interest.

In a preferred embodiment, the first positioning element includes an upper plate element, a lower plate element and connecting means that connect the upper plate element and lower plate element, wherein the upper plate element is arranged next to a top side of the platform, the lower plate element is arranged next to a bottom side of the platform and the connecting means are arranged at least partially inside the open space.

The first positioning element including the upper plate element, lower plate element and connecting means can slide above the platform. The upper plate element is in contact with the top side of the platform and the lower plate element is in contact with the bottom side of the platform. The upper plate element and lower plate element generate a frictional connection between them and the platform. The strength of the frictional connection may be adapted via the connecting means and via surface enhancements of the top side of the platform and of a lower surface of the upper plate element such that the first positioning element and all components connected to the first positioning element can slide easily and precisely with respect to the platform when handled by the user for fine positioning. On the other side, the frictional connection should avoid that the first positioning element is moved without interaction of the user during movement of a chassis to which the target and plumbing system is mounted.

In a preferred embodiment, the first positioning element is rotatable about a rotating axis with respect to the second positioning element, wherein the rotating axis is substantially parallel to the gravitational direction. The design of the first positioning element and second positioning element allows that the first positioning element may be rotated about the rotating axis in any translational position such that the user can orient the reflective target and plumb line laser pointer towards the laser controller. Without any restriction to the direction of positioning inside the open space, the target and plumbing system can reduce the time that is necessary to find a point of interest.

In a preferred embodiment, the target and plumbing system includes a connecting unit, which is connected to the second positioning element and is provided to be connected to a movable and/or portable chassis. Preferably, the connecting unit includes a standard interface, e.g. ⅝ inches thread, such that the target and plumbing system can be connected to preexisting movable and/or portable chassis.

A further aspect of the invention is related to a movable and/or portable layout accessory comprising the target and plumbing system according to the invention, and a movable and/or portable chassis. The combination of target and plumbing system with a movable and/or portable chassis allows for the user a comfortable handling of the target and plumbing system. The movable chassis may include wheels, rollers or sliding elements and the portable chassis may include foot elements in different embodiments.

In a preferred embodiment, the target and plumbing system is connected to an operating element. To layout points of interest on ceiling surfaces, the chassis can be extended to its maximum length. In the extended position, the target and plumbing system may be not operable by the user. To operate the target and plumbing system, the positioning device may be connected to the operating element that can be operated by the user. The operating element allows to arrange the target and plumbing system in a height such that a line-of-sight between the laser controller and the reflective target may not be interrupted by material and/or tools stored on the jobsite or by users working on the jobsite. The operating element may be connected to the first positioning element, the holding device, the plumb line laser pointer and/or the reflective target.

In a preferred embodiment, the target and plumbing system is mounted to an extension arm. The use of an extension arm may allow to mount the target and plumbing system at a first end of the extension arm and the remote controller at a second end of the extension arm. The extension arm allows to balance the target and plumbing system and the remote controller.

A further aspect of the invention is related to a layout and point transfer system to find a predetermined point of interest, the layout and point transfer system comprises:

a laser controller, including: (i) a distance measuring device that measures a distance by a measuring beam, the measuring beam being rotatable about a first rotating axis and being pivotable about a first pivoting axis, the first rotating axis being substantially parallel to a gravitational direction and the first pivoting axis being substantially perpendicular to the gravitational direction; (ii) a first angle measuring device that measures an azimuth angle of the measuring beam with respect to a first zero angle in a horizontal plane, the horizontal plane being substantially perpendicular to the gravitational direction; (iii) a second angle measuring device that measures an elevation angle of the measuring beam with respect to a second zero angle in a vertical plane, the vertical plane being substantially parallel to the gravitational direction; and (iv) a first processing circuit, a first memory circuit including instructions executable by the first processing circuit, a first communications circuit, and a first input/output interface circuit, a remote controller, including: (i) a display device; (ii) a user-operated input circuit; and (iii) a second processing circuit, a second memory circuit including instructions executable by the second processing circuit, a second communications circuit, and a second input/output interface circuit, wherein the laser controller and the remote controller communicate with one another by use of the first communications circuit and second communications circuit, the target and plumbing system according to the invention, wherein the target and plumbing system comprises a movable unit including the reflective target, the plumb line laser pointer, the holding device and the first positioning element and the movable unit being movable with respect to the second positioning element, wherein the first and second processing circuits are configured:

using the distance measuring device, the first angle measuring device, and the second angle measuring device, measuring a current distance value, azimuth angle value and second angle value for the target and plumbing system, using the first processing circuit of the laser controller and/or the second processing circuit of the remote controller, calculating a current position of the target and plumbing system from the measured current distance value, azimuth angle value and second angle value and calculating between the current position of the target and plumbing system and the predetermined point of interest at least a first deviation in a first direction and a second deviation in a second direction, wherein the first direction is coaxially aligned with an intersecting line between the horizontal plane and a vertical plane that runs through a line-of-sight of the laser controller to the target and plumbing system and wherein the second direction is substantially perpendicular to the first direction and arranged in the horizontal plane, using the laser controller and/or the remote controller, outputting a visible and/or audible indication that corresponds to the first deviation and second deviation, while monitoring the visible and/or audible indication, moving the target and plumbing system until the first deviation and second deviation are smaller than a predetermined first limit, stopping the movement of the target and plumbing system and arranging the target and plumbing system in a stable and substantially leveled position, while monitoring the visible and/or audible indication, moving the movable unit of the target and plumbing system with respect to the second positioning element until the first deviation and second deviation are zero or at least smaller than a predetermined second limit, the second limit being smaller than the first limit.

The layout and point transfer system according to the invention supports the user in layouting points of interest rapid and accurate. The accuracy of layouting is independent of the circumstances of the jobsite surface since the fine positioning is performed by the target and plumbing system. The layout and point transfer system allows a fine positioning of both the reflective target and the plumb line laser pointer in any horizontal translational direction inside the open space of the platform; there are no restrictions to a first translational direction and a second translational direction that is perpendicular to the first translational direction.

Without any restriction to the direction of positioning inside the open space, the layout and point transfer system according to the invention can reduce the time that is necessary to find a point of interest.

In a preferred embodiment, the plumb line laser pointer is configured, emitting the plumb line laser beam and generating a lower plumb point on a floor of the jobsite and/or an upper plumb point on a ceiling of the jobsite. Since the plumb line laser beam is coincident with the point of interest, the plumb line laser beam can be used to transfer the point of interest vertically with high accuracy to jobsite surfaces. A downward-going plumb line laser beam can be used to transfer the point of interest to the floor and an upward-going plumb line laser beam can be used to transfer the point of interest to the ceiling.

A further aspect of the invention is related to a method for layouting and transferring a point of interest, the method comprising:

> providing a laser controller, which includes: (i) a distance measuring device that measures a distance by a measuring beam, the measuring beam being rotatable about a first rotating axis and being pivotable about a first pivoting axis, the first rotating axis being substantially parallel to a gravitational direction and the first pivoting axis being substantially perpendicular to the gravitational direction; (ii) a first angle measuring device that measures an azimuth angle of the measuring beam with respect to a first zero angle in a horizontal plane, the horizontal plane being substantially perpendicular to the gravitational direction; (iii) a second angle measuring device that measures an elevation angle of the measuring beam with respect to a second zero angle in a vertical plane, the vertical plane being substantially parallel to the gravitational direction; and (iv) a first processing circuit, a first memory circuit including instructions executable by the first processing circuit, a first communications circuit, and a first input/output interface circuit,
>
> providing a remote controller, which includes: (i) a display device; (ii) a user-operated input circuit; and (iii) a second processing circuit, a second memory circuit including instructions executable by the second processing circuit, a second communications circuit, and a second input/output interface circuit, wherein the laser controller and the remote controller communicate with one another by use of the first communications circuit and second communications circuit,
>
> providing a target and plumbing system according to the invention, wherein the target and plumbing system comprises a movable unit including the reflective target, the plumb line laser pointer, the holding device and the first positioning element and the movable unit being movable with respect to the second positioning element,
>
> placing the laser controller on a jobsite surface in a work area,
>
> finding the predetermined point of interest, by:
>
>> using the distance measuring device, the first angle measuring device and the second angle measuring device, measuring a current distance value, first angle value and second angle value for the target and plumbing system,
>>
>> using the first processing circuit of the laser controller and/or the second processing circuit of the remote controller, calculating a current position of the target and plumbing system from the measured current distance value, first angle value and second angle > value and calculating between the current position of the target and plumbing system and the predetermined point of interest at least a first deviation in a first direction and a second deviation in a second direction, wherein the first direction is coaxially aligned with an intersecting line between the horizontal plane and a vertical plane that runs through a line-of-sight of the laser controller to the target and plumbing system and wherein the second direction is substantially perpendicular to the first direction and arranged in the horizontal plane,
>
>> using the laser controller and/or the remote controller, outputting a visible and/or audible indication that corresponds to the first deviation and second deviation,
>>
>> while monitoring the visible and/or audible indication, moving the target and plumbing system until the first deviation and second deviation are smaller than a predetermined first limit,
>>
>> stopping the movement of the target and plumbing system and arranging the target and plumbing system in a stable and substantially leveled position,
>>
>> while monitoring the visible and/or audible indication, moving the movable unit of the target and plumbing system with respect to the second positioning element until the first deviation and second deviation are zero or at least smaller than a predetermined second limit, the second limit being smaller than the first limit.

The method for layouting and transferring a point of interest according to the invention allows a fine positioning of both the reflective target and the plumb line laser pointer in any horizontal translational direction inside the open space; there are no restrictions to a first translational direction and a second translational direction that is perpendicular to the first translational direction. Without any restriction to the direction of positioning inside the open space, the method according to the invention can reduce the time that is necessary to find a point of interest.

In a preferred embodiment, the method further comprising using the plumb line laser pointer, emitting the plumb line laser beam in the substantially vertical direction and generating a lower plumb point on a floor of the jobsite and/or an upper plumb point on a ceiling of the jobsite. Since the plumb line laser beam is coincident with the point of interest, the plumb line laser beam can be used to transfer the point of interest vertically with high accuracy to jobsite surfaces. A downward-going plumb line laser beam can be used to transfer the point of interest to the floor and an upward-going plumb line laser beam can be used to transfer the point of interest to the ceiling.

In a preferred embodiment, the method further comprising transferring the lower plumb point on the floor of the jobsite and/or the upper plumb point on the ceiling of the jobsite. The plumb line laser pointer can emit a downward-going plumb line laser beam generating the lower plumb point that is coincident with the point of interest and an upward-going plumb line laser beam generating the upper plumb point that is coincident the point of interest. The point of interest can be transferred with high accuracy via the lower plumb point to the floor and via the upper plumb point to the ceiling.

The aspects of the invention are described or explained in more detail below, purely by way of example, with reference to working examples shown schematically in the drawings. Identical elements are labelled with the same reference numerals in the figures. The described embodiments are generally not shown true in scale and they are also not to be interpreted as limiting the invention.

BRIEF DESCRIPTION OF THE DRAWINGS

FIG. 3 is a flow chart showing the steps of a method for layouting and transferring a point of interest using the layout and point transfer system;

DETAILED DESCRIPTION OF THE DRAWINGS

Figure 1A:
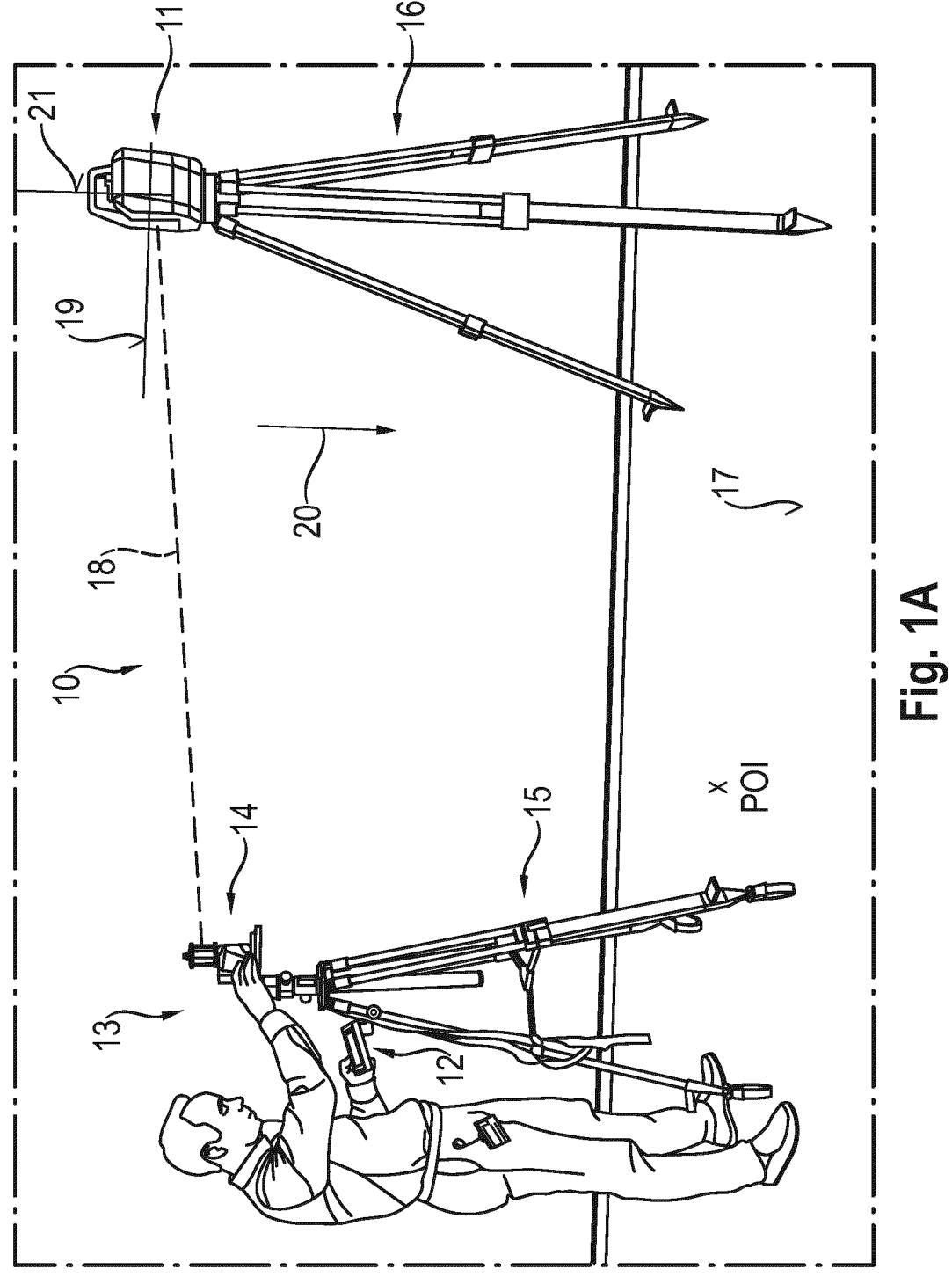
FIGS. 1A, B show a layout and point transfer system that includes a laser controller arranged on a tripod device, a remote controller, and a first embodiment of a layout accessory including a target and plumbing system and a movable chassis.

Reference will now be made in detail to the present preferred embodiment, an example of which is illustrated in the accompanying drawings. It is to be understood that the technology disclosed herein is not limited in its application to the details of construction and the arrangement of components set forth in the following description or illustrated in the drawings. The technology disclosed herein is capable of other embodiments and of being practiced or of being carried out in various ways.

Also, it is to be understood that, the phraseology and terminology used herein is for the purpose of description and should not be regarded as limiting. The use of "including, or "comprising, or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings. In addition, the terms "connected" and "coupled", and variations thereof are not restricted to physical or mechanical connections or couplings.

FIGS. 1A, B show a layout and point transfer system 10 that is designed for layouting and transferring a point of interest (POI) vertically to a jobsite surface according to the present invention. The layout and point transfer system 10 comprises a laser controller 11, a remote controller 12, and a first embodiment of a layout accessory 13 including a target and plumbing system 14 according to the present invention and a movable chassis 15. The target and plumbing system 14 and the remote controller 12 are mounted to the chassis 15 and the laser controller 11 is mounted on a tripod device 16, wherein the chassis 15 and tripod device 16 are arranged on a jobsite surface that is designed as floor 17.

The basic concept of the layout and point transfer system 10 is generally illustrated in FIG. 1A. The laser controller 11 is designed as a robotic total station that is controlled with a software application installed on the remote controller 12, which is designed as a tablet computer. The laser controller 11 includes a distance measuring device that provides a capability of measuring a distance between the laser controller 11 and the target and plumbing system 14, which is located at the user and handled by the user, with a measuring beam 18; the measuring beam 18 can be a visible laser beam or an infrared laser beam. The laser controller 11 further includes a first angle measuring device that provides a capability of measuring an azimuth angle (first angle) of the measuring beam 18 in a horizontal plane 19 that is substantially perpendicular to a gravitational direction 20 and a second angle measuring device that provides a capability of measuring an elevation angle (second angle) of the measuring beam 18 in a vertical plane 21 that is substantially parallel to the gravitational direction 20.

Figure 1B:
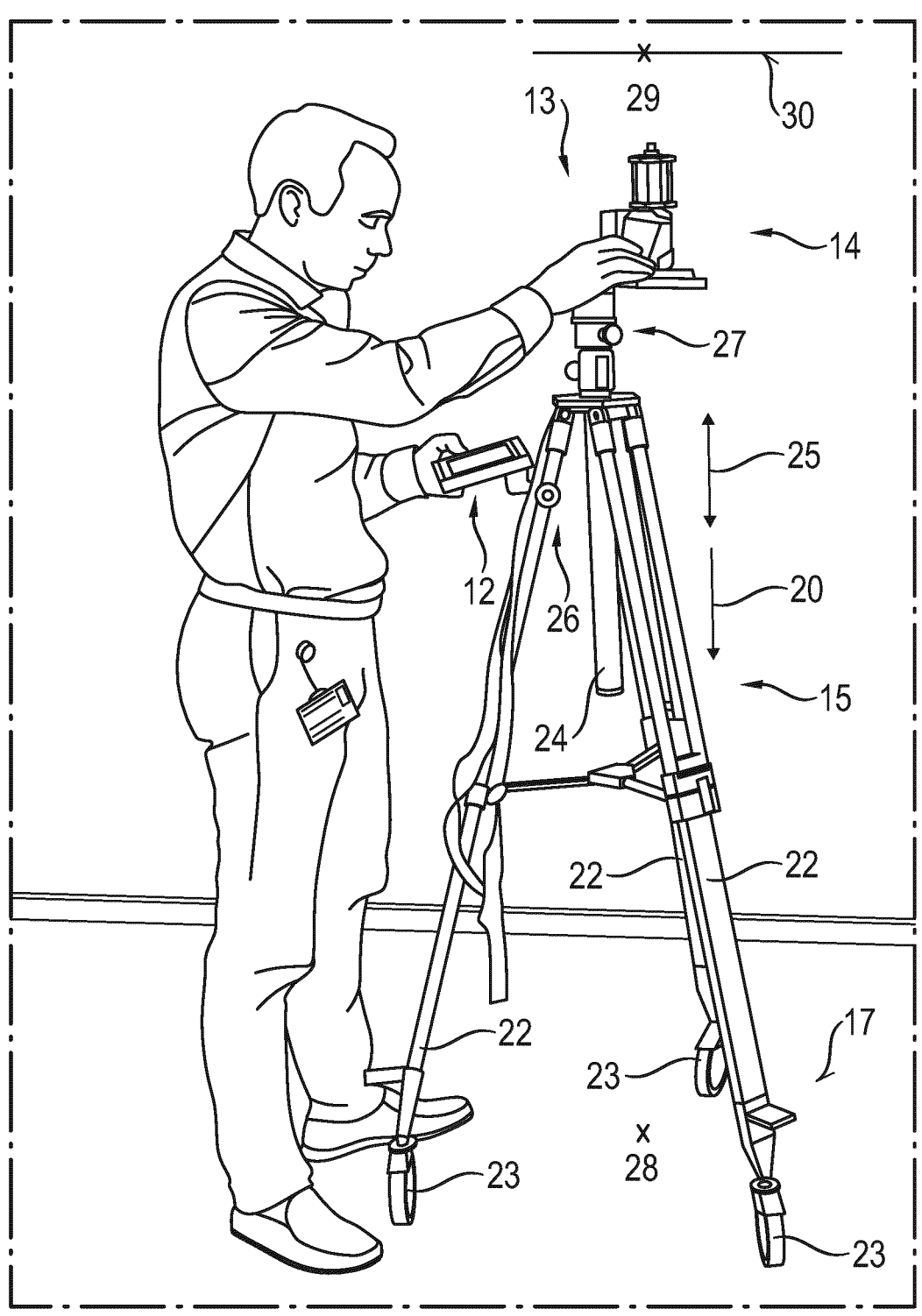

FIG. 1B shows the layout accessory 13 in detail. The layout accessory 13 includes the target and plumbing system 14 and the movable chassis 15, which is designed as a tripod device. The tripod device 15 includes three legs 22, which may be adjusted in length, three wheels 23, which allow the layout accessory 13 to move over the floor 17, and a central rod 24, which may be adjusted along a height direction 25 that is substantially parallel to the gravitational direction 20. In FIG. 1B, the central rod 24 is arranged in its lowest position with respect to a head of the tripod device 15. The target and plumbing system 14 can be placed via the tripod device 15 at whatever height is needed dependent on the conditions of the jobsite between a minimum position and a maximum position.

The remote controller 12 can be mounted via a bracket element 26 to one of the legs 22 of the tripod device 15 or to the central rod 24, wherein the position of the bracket element 26 may be shifted along the leg 22 or along the central rod. The target and plumbing system 14 can be connected to the central rod 24 via a connecting unit 27, which may include a standard interface, e.g., ⅝ inches thread, such that the target and plumbing system 14 can be connected to a preexisting movable and/or portable chassis, such as the tripod 15. Alternatively, the target and plumbing system 14 may be fixedly connected to a movable and/or portable chassis. The target and plumbing system 14 can generate a lower plumb point 28 on the floor 17 and an upper plumb point 29 on a ceiling 30 of the jobsite. The lower and/or upper plumb points 28, 29 can be used to transfer a point of interest on the floor 17 and/or on the ceiling 30.

Figure 2A:
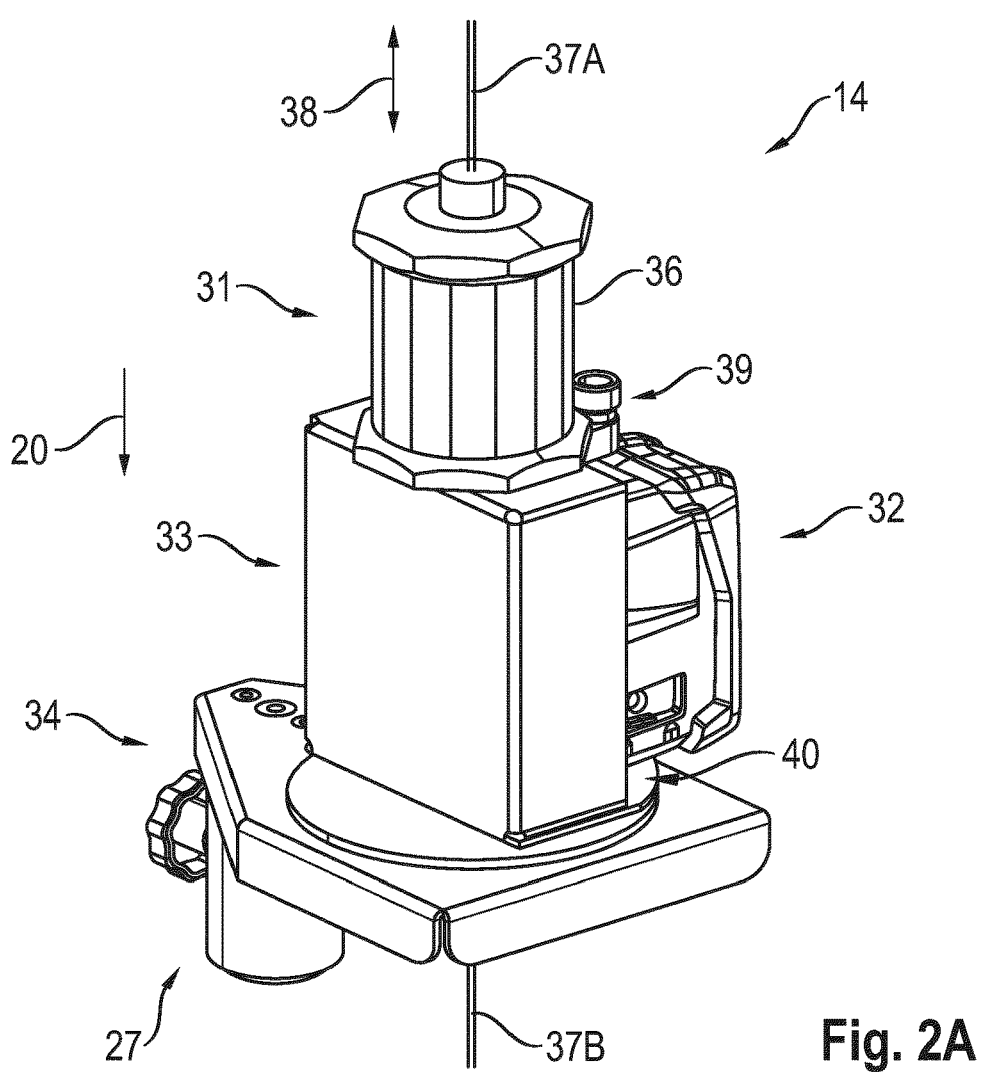
FIGS. 2A-C show the target and plumbing system of FIG. 1 in a 3D view (FIG. 2A), a detail (FIG. 2B) and in an exploded view (FIG. 2C)
Figure 2B:
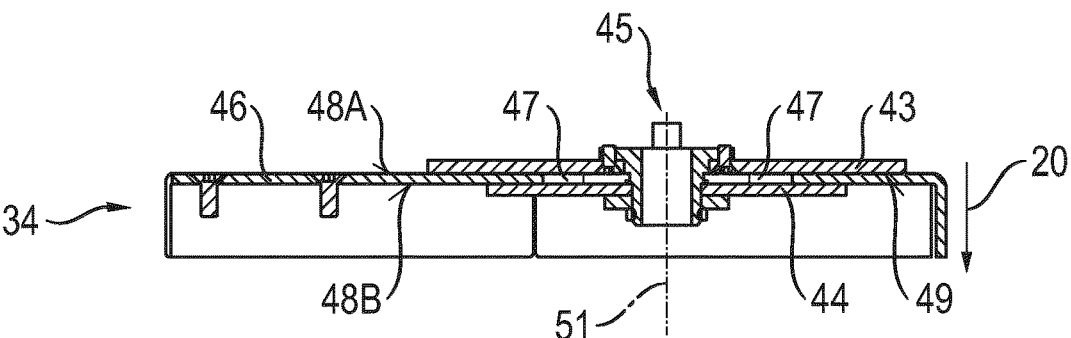
Figure 2C:
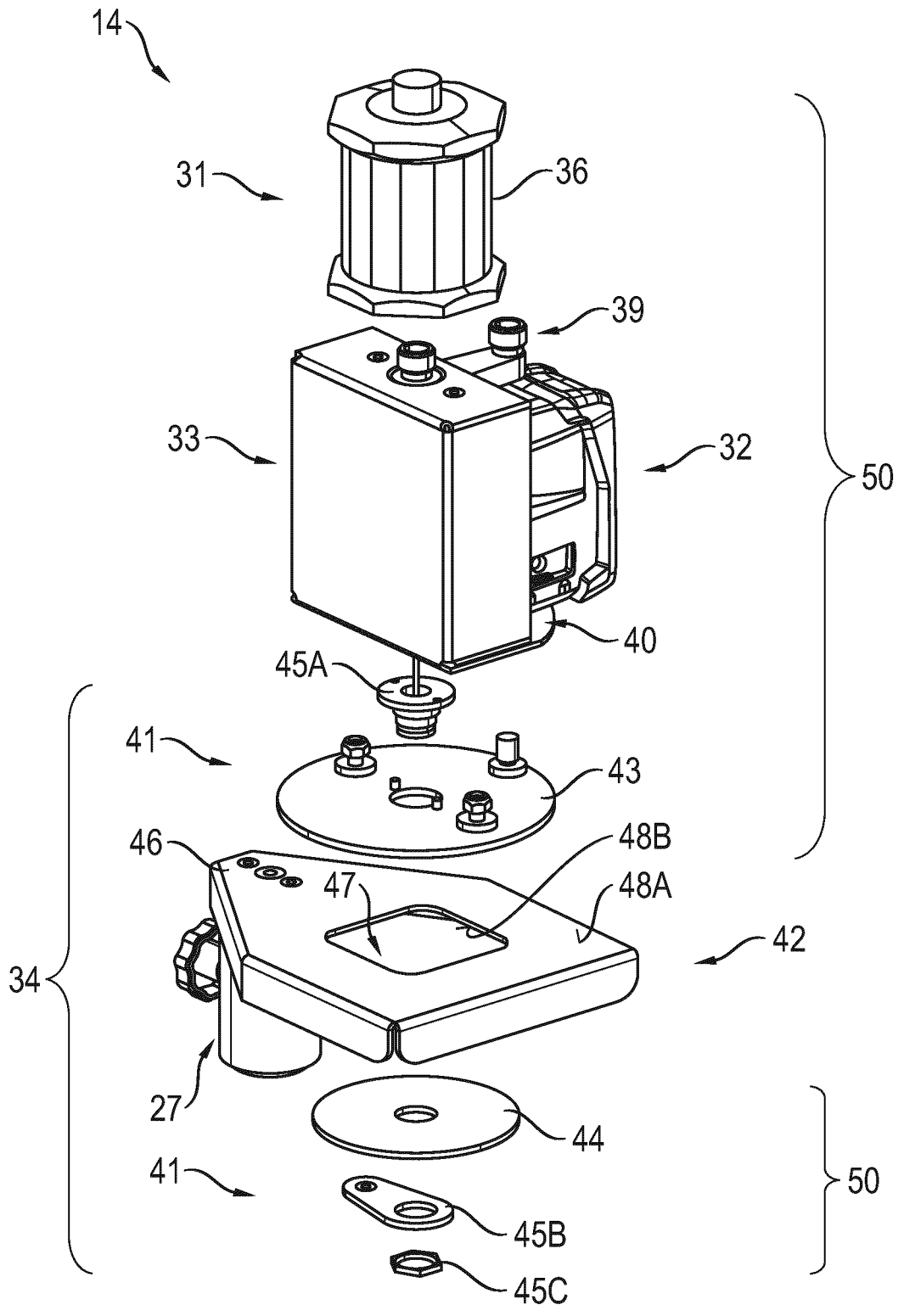

FIGS. 2A-C show the target and plumbing system 14 of the layout and point transfer system 10 in a 3D view (FIG. 2A), a detail in a longitudinal cut (FIG. 2B) and in an exploded view (FIG. 2C). The target and plumbing system 14 includes a reflective target 31, a self-leveling plumb line laser pointer 32, a holding device 33 and a positioning device 34.

The reflective target 31 is designed as a prism and includes a reflective surface 36, which is at least partially reflective for the wavelength of the measuring beam 18. The distance measuring device of the laser controller 11 emits the measuring beam 18 that is reflected at the reflective surface 36 and received by the distance measuring device.

The self-leveling plumb line laser pointer 32 includes a self-leveling mount and at least one laser emitter, which emits a plumb line laser beam 37 having a pathway that is in a vertical direction 38, the vertical direction 38 being substantially parallel to the gravitational direction 20. Since the plumb line laser beam 37 is used for transferring points of interest vertically on the floor 17 and/or on the ceiling 30, the wavelength of the plumb line laser pointer 32 may be in the visible range, e.g., red or green range. The plumb line laser beam 37 includes a downward-going plumb line laser beam 37A and an upward-going plumb line laser beam 37B.

The holding device 33 may be formed as cage or similar component and includes a first holding element 39 that assists in holding the reflective target 31 in a defined position and a second holding element 40 that assists in holding the plumb line laser pointer 32 in a defined position. By means of the holding device 33, the reflective target 31 and the plumb line laser pointer 32 have a defined arrangement to each other.

The positioning device 34 includes a first positioning element 41 and a second positioning element 42. The first positioning element 41 includes an upper plate element 43, a lower plate element 44 and connecting means 45 that connect the upper plate element 43 and lower plate element 44 to each other. The second positioning element 42 is designed as platform 46 including an open space 47 that defines a region of a two-dimensional area.

In the assembled state shown in FIG. 2A and in the detail shown in FIG. 2B, the upper plate element 43 is arranged next to a top side 48A of the platform 46 and the lower plate element 44 is arranged next to a bottom side 48B of the platform 46. The upper and lower plate elements 43, 44 are connected by the connecting means 45 which may include a screw 45A, a washer 45B and a screw nut 45C. The connecting means 45 are arranged at least partially inside the open space 47 of the platform 46 and may be moved horizontally inside that 2D area defined by the open space 47. The movement of the first positioning element 41 is limited in the horizontal plane only by the edges of the open space 47, wherein inside the open space 47 there is no restriction for the movement.

The upper plate element 43 and lower plate element 44 generate a frictional connection between them and the platform 46. The strength of the frictional connection may be adapted via the connecting means 45 and via surface enhancements of the top side 48A of the platform 46 and of a lower surface 49 of the upper plate element 43. The upper plate element 43, the lower plate element 44 and the platform 46 may be fabricated from metal or any other suitable material, such as plastic. The strength of the frictional connection may be adapted such that the first positioning element 41 and all components connected to the first positioning element 41 can slide easily and precisely with respect to the platform 46 when handled by the user for fine positioning. On the other side, the frictional connection should avoid that the first positioning element 41 is moved without interaction of the user during movement of a chassis to which the target and plumbing system 14 is mounted.

A good balance between easy and precise sliding and a stable position can be reached by special combinations of materials and/or by using a brake element. For example, the connecting means 45 of the positioning device 34 can be used to define a sliding mode and a brake mode for the positioning device 34. By the screw nut 45C the strength of the frictional connection can be adapted. In a first position of the connecting means 45, the strength of the frictional connection allows an easy and precise sliding of the first positioning element 41 over the platform 46. By turning the screw nut 45C, the connecting means 45 are shifted from the first position that corresponds to the sliding mode to a second position that corresponds to the brake mode. The strength of the frictional connection in the brake mode is increased compared to the sliding mode such that a sliding of the first positioning element 41 over the platform 46 is prevented. It should be noted that the screw nut 45C or any other brake element should allow easy access for the user to handle the brake element.

To enable the plumb line laser pointer 32 to direct the plumb line laser beam 37 downward to the floor, all elements of the positioning device 34 include an opening to permit the passage of the plumb line laser beam 37. The openings are designed to be substantially at the center of the elements, although it is not necessary, if the system designer wishes to move the openings to a different position. The integration of openings into the elements of the positioning device 34 allows a compact design of the target and plumbing system 14.

The platform 46 is composed of a first part that is designed for fine positioning and a second part that is designed for mounting the platform 46 to a movable and/or portable chassis, such as the tripod device 15. The first part of the platform 46 includes the open space 47, arranged substantially at the center of the first part, although it is not necessary, if the system designer wishes to move the open space 47 to a different position. It should be noted that also the size and the shape of the open space 47 are completely up to the system designer. Of course, it probably could be desirable to have an open space 47, which is symmetrically in its dimensions and which allows a fine positioning of the reflective target 31 and the plumb line laser pointer 32 within a suitable range, e.g., 5 cm.

The target and plumbing system 14 is composed of a movable unit 50 that includes the reflective target 31, the plumb line laser pointer 32, the holding device 33 and the first positioning element 41. The movable unit 50 is movable with respect to the second positioning element 42 in any horizontally translational direction inside the open space 47 and is rotatable about a rotating axis 51 that is substantially parallel to the gravitational direction 20. The design of the movable unit 50 and the second positioning element 42 allows that the movable unit 50 may be rotated about the rotating axis 51 in any translational position such that the user can orient the reflective target 31 towards the laser controller 11.

The movable unit 50 is movable to the second positioning element 42 in any horizontally translational direction inside the open space 47 and is rotatable about a rotating axis 51 that is substantially parallel to the gravitational direction 20.

FIG. 3 shows a flow chart showing steps of a method for layouting and transferring the point of interest POI by using the layout and point transfer system 10 of FIG. 1A. Before layouting and transferring the point of interest can start, the laser controller 11 and remote controller 12 must be initialized (step S10) and the laser controller 11 must be stationed to the jobsite (step S20). Procedures for stationing a laser controller 11 are known from prior art and typically defined in a user manual for the laser controller 11.

The laser controller 11 is preferably designed as robotic total station that may be easily operated by a single user. Robotic total stations are operable in different modes of operation, which include amongst others a searching mode and a tracking mode. In the searching mode, the robotic total station will perform a predetermined procedure to find the reflective target 31 of the target and plumbing system 14. Once the reflective target 31 has been found, the robotic total station is switched to the tracking mode that allows to follow the reflective target 31 during its movement. At step S30, the laser controller 11 will perform a first partial step, in which the reflective target 31 will be searched with the laser controller 11 operating in the searching mode, and a second partial step, in which the reflective target 31 will be locked to and followed by the laser controller 11 operating in the tracking mode.

At step S40, the point of interest that should be transferred vertically the layout and point transfer system 10 is selected from a list of points of interest or is inputted to the remote controller 12 and the remote controller 12 calculates the coordinates of the selected point of interest, preferably in the reference frame of the laser controller 11.

At step S50, the laser controller 11 will perform a distance measurement, a first angle measurement and a second angle measurement and will send the measured distance value, measured azimuth angle value and measured elevation angle value to the remote controller 12; the current position of the target and plumbing system 14 can be calculated from the measured distance value, azimuth angle value, and elevation angle value in the reference frame of the laser controller 11. The sample rate should be quite fast, so that the user feels he is receiving almost continuous updates of the measured distance value, azimuth angle value, and elevation angle value.

At step S60, the remote controller 12 will perform a first partial step and second partial step. In the first partial step, the remote controller 12 will calculate a current position of the target and plumbing system 14 from the measured distance value, azimuth angle value and elevation angle value and, in the second partial step, the remote controller 12 will calculate between the current position of the target and plumbing system 14 and the predetermined point of interest (POI) a first deviation $d_1$ in a first direction and a second deviation $d_2$ in a second direction. The definition of the first direction and second direction will be explained in FIGS. 4A, B. For transferring the point of interest POI vertically to the floor 17 and/or ceiling 30 only the first and second deviations $d_1$, $d_2$ are relevant, for three-dimensional applications also a third deviation in a third direction that is substantially perpendicular to the first direction and to the second direction may be calculated by the remote controller 12.

The remote controller 12 will display the calculated first and second deviations $d_1$, $d_2$ and the directions (backwards or forwards) to the user (step S70). At step S80, the remote controller 12 will check if the first and second deviations $d_1$, $d_2$ are smaller than a predetermined first limit $D_1$, e.g., 5 cm. The user will move the layout accessory 13 instructed by the remote controller 12 towards the selected point of interest (step S90), and the loop of steps S50 to S80 will be repeated until the first and second deviations $d_1$, $d_2$ are smaller than the first limit $D_1$.

In case that the first and second deviations $d_1$, $d_2$ are smaller than the first limit $D_1$, the remote controller 12 can display a message to the user that he can stop the movement, and the user will stop the movement of the layout accessory 13 and arrange the target and plumbing system 14 in a stable and substantially leveled position (step S100). To avoid measuring errors, the user can use an adjusting element and a bubble level on the target and plumbing system 14 to make sure that the target and plumbing system 14 is leveled properly. The target and plumbing system 14 is called to be leveled properly when the plumb line laser pointer 32 is arranged in its self-leveling range.

The laser controller 11 will perform periodic distance, azimuth angle and elevation angle measurements (step S110) and will send the measured distance, azimuth angle and elevation angle values to the remote controller 12. The remote controller 12 will calculate the current position of the target and plumbing system 14 and calculate between the current position and the predetermined point of interest (POI) the first deviation $d_1$ in the first direction and the second deviation $d_2$ in the second direction (step S120). The remote controller 12 will display the first and second deviations $d_1$, $d_2$ and the direction (backwards or forwards) to the user (step S130). The user will move the mobile unit 50 with respect to the platform 46 instructed by the remote controller 12 towards the selected point of interest (step S150), and the loop of steps S110 to S140 will be repeated until the first and second deviations $d_1$, $d_2$ are smaller than a predetermined second limit $D_2$, e.g., 1 mm, wherein the second limit $D_2$ is smaller than the first limit $D_1$.

In case that the calculated first and second deviations $d_1$, $d_2$ are smaller than the second limit $D_2$, the remote controller 12 can display a message to the user that the selected point of interest has been reached and that the user can now transfer the point of interest to the jobsite surface, on the floor 17 and/or on the ceiling 30. The plumb line laser pointer 32 can generate on the floor 17 the lower plumb point 28, which can be transferred by the user to the floor 17, and on the ceiling 30 the upper plumb point 29, which can be transferred by the user to the ceiling 30 (step S160).

After transferring the selected point of interest to the floor 17 and/or to the ceiling 30, the method for layouting and transferring the point of interest may be continued with selecting a new point of interest in step 40. The steps S40 to S160 can be repeated for each point of interest of a list of points of interest stored in the remote controller 12.

Figure 4A:
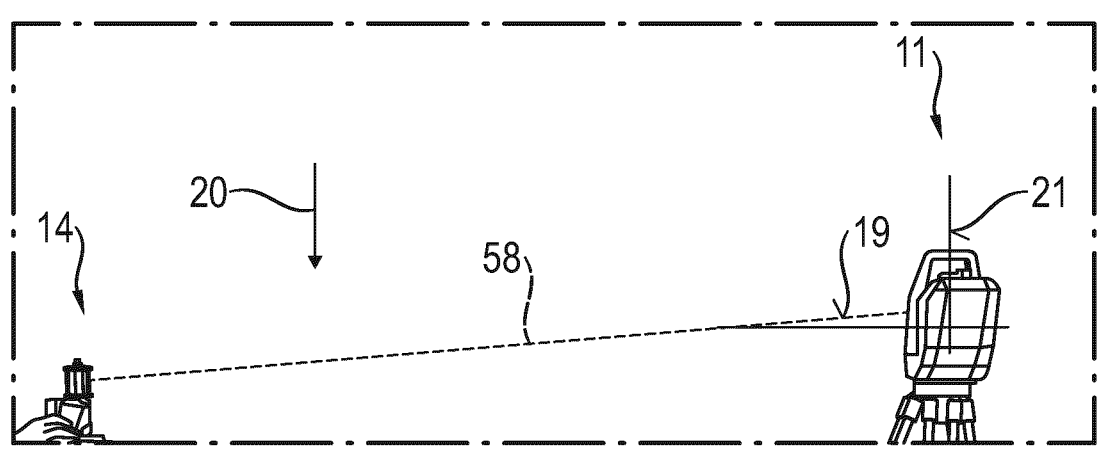
FIG. 4 shows the laser controller and the target and plumbing system in schematic illustration to explain the definition of a first direction and a second direction.
Figure 4B:
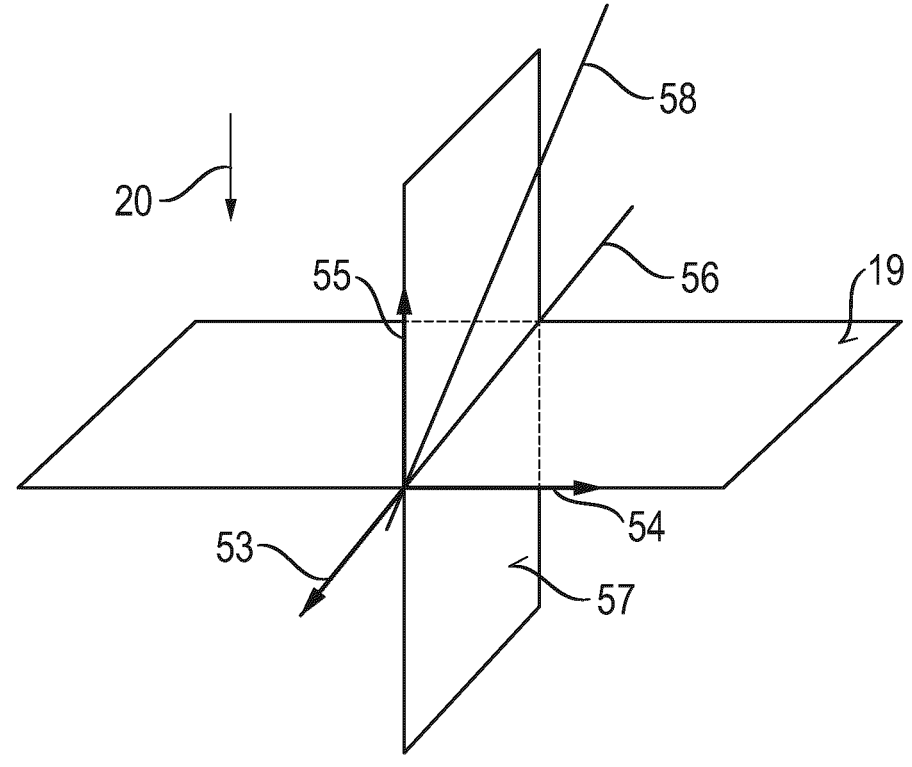

FIGS. 4A, B show the laser controller 11 and the target and plumbing system 14 in schematic illustration to explain the definition of a first direction 53, in which the first deviation $d_1$ is calculated, the definition of a second direction 54, in which the second deviation $d_2$ is calculated, and the definition of a third direction 55, in which a third deviation can be calculated.

The first direction 53 is coaxially aligned with an intersecting line 56 between the horizontal plane 19 and a vertical plane 57 that is substantially parallel to the gravitational direction 20 and runs through a line-of-sight 58 of the laser controller 11 to the target and plumbing system 14; the line-of-sight 58 is coaxially aligned to the direction of the measuring beam 18 to the reflective target 31. The second direction 54 is substantially perpendicular to the first direction 53 and arranged in the horizontal plane 19. The third direction 55 is substantially perpendicular to the first direction 53 and substantially perpendicular to the second direction 54.

Figure 5:
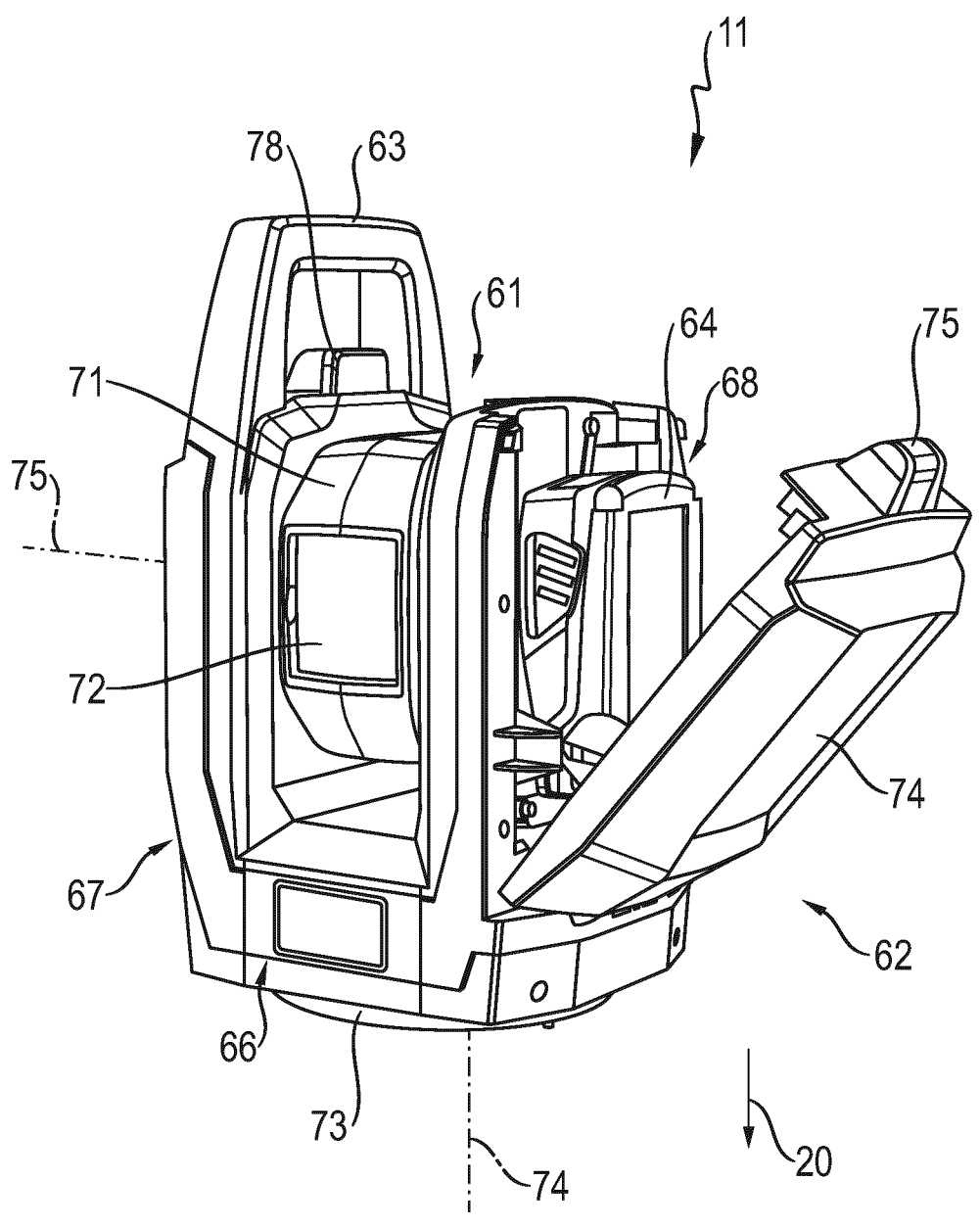
FIG. 5 shows an exemplary version of the laser controller used in the layout and point transfer system of FIG. 1.

FIG. 5 shows an exemplary version of the laser controller 11 used in the layout and point transfer system 10. The laser controller 11 is designed as a robotic total station and comprises a measuring head 61, a main housing 62, a grip 63, and a battery pack 64 for powering the laser controller 11. The main housing 62 is U-formed and includes a bottom portion 66, a first side portion 67, and a second side portion 68; the grip 63 is mounted to the first side portion 67.

The measuring head 61 is enclosed by a housing 71, which includes a laser exit window 72. A distance measuring device that emits the measuring beam 18 is located in the housing 71 and the measuring beam 18 is emitted through the laser exit window 72. The main housing 62 of the laser controller 11 can rotate completely around its circumference at a full 360° angle with respect to a disc 73 about a first rotating axis 74 that is substantially parallel to the gravitational direction 20. The measuring head 61 is pivotably mounted to the main housing 62 about a first pivoting axis 75 and is arranged between the first side portion 67 and the second side portion 68 of the main housing 62.

An azimuth motor device and a first angle measuring device are located in the bottom portion 66 of the main housing 62 and allow to rotate the laser controller 11 about the first rotating axis 74 and to determine the direction of the measuring beam 18 in the horizontal plane 19 (azimuth angle). An elevation motor device and a second angle measuring device are located in the first side portion 67 of the main housing 62 and allow the measuring head 61 to pivot about the first pivoting axis 75 and to determine the direction of the measuring beam 18 in the vertical plane 21 (elevation angle). To make the laser controller 11 fully automatic, it is preferred to include a self-leveling device, which will be located in the bottom portion 66 of the main housing 62.

The battery pack 64 is included in the second side portion 68 of the main housing 62. To change the battery pack 64 or to charge the battery pack 64, the second side portion 68 includes a battery compartment 76, which can be opened by using a battery compartment catch 77. Antennas 78 may be included in the main housing 62 for receiving and transmitting wireless signals.

Figure 6:
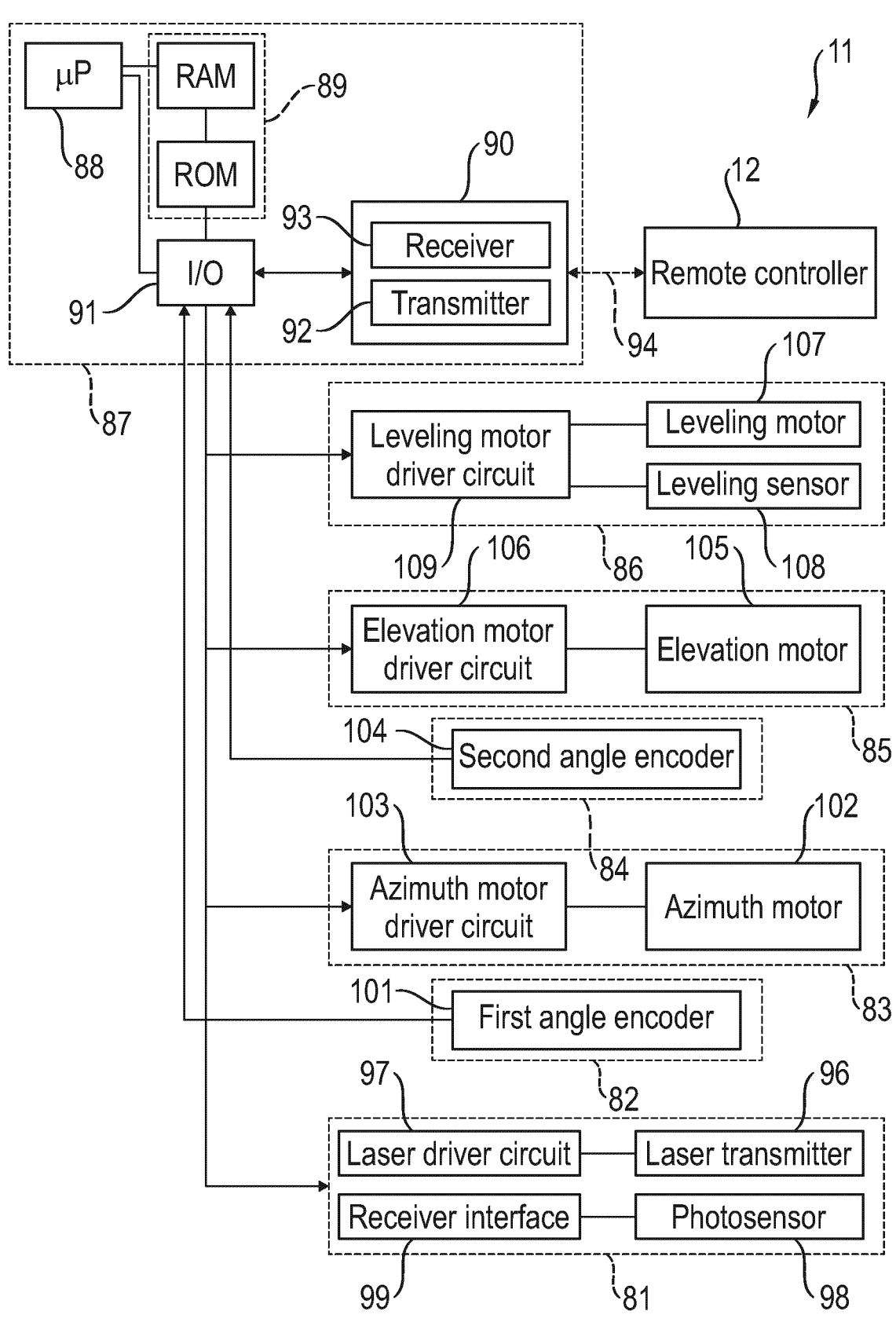
FIG. 6 is a block diagram of the main components of the laser controller as illustrated in FIG. 4 and used in the layout and point transfer system of FIG. 1.

FIG. 6 shows a block diagram of the main components of the laser controller 11 used in the layout and point transfer system 10 illustrated in FIG. 1. The laser controller 11 includes a distance measuring device 81, a first angle measuring device 82 to measure the azimuth angle, an azimuth motor device 83, a second angle measuring device 84 to measure the elevation angle, an elevation motor device 85, a leveling motor device 86, and a first electronic device 87.

The first electronic device 87 comprises a first processing circuit 88, a first memory circuit 89, a first communications circuit 90, and a first input/output (I/O) interface circuit 91. The first memory circuit 89 includes associated random-access memory (RAM) and read only memory (ROM). The first processing circuit 88 can communicate with the first memory circuit 89 and the first communications circuit 90 by use of a bus, which typically is referred to as an address bus or as a data bus, and can also contain other types of signals, such as interrupts and perhaps other types of timing signals. The first input/output interface circuit 91 is an interface between the first processing circuit 88 and the various types of motor drive circuits and sensor circuits of the laser controller 11. The first input/output interface circuit

91 will be in communication with the first communications circuit 90, which includes a first transmitter circuit 92 and a first receiver circuit 93. The first communications circuit 90 is designed to communicate and to exchange data information with the remote controller 12, typically using a wireless signal via a communication link 94. In the layout and point transfer system 10, the laser controller 11 will communicate distance values, azimuth angle values and elevation angle values with the remote controller 12, and those values arrive via the communication link 94 to and from the first communications circuit 90. In a preferred mode of the layout and point transfer system 10, the communication link 94 will be wireless, although a cable could be connected between the first communications circuit 90 and the remote controller 12.

The distance measuring device 81 includes a laser transmitter 96, a laser driver circuit 97, a photosensor 98, and a laser receiver interface circuit 99. The laser driver circuit 97 provides current for the laser transmitter 96 which emits the measuring beam 18. The photosensor 98 receives at least a part of the measuring beam 18 reflected at the reflective surface 36 of the reflective target 31, and the current signal that is outputted by the photosensor 98 is directed to the laser receiver interface circuit 99. After appropriate amplification and demodulation, the signal is sent via the first input/output interface circuit 91 to the first processing circuit 88.

The first angle measuring device 83 includes a first angle encoder 101, which will provide input signals to the first processing circuit 88, so that it knows exactly in which azimuth angle the laser transmitter 96 is arranged in the horizontal plane 19. The output signal of the first angle encoder 101 is directed to the first input/output interface circuit 91.

The azimuth motor device 83 includes an azimuth motor 102 and an azimuth motor driver circuit 103. The azimuth motor driver circuit 103 will provide the proper current and voltage to drive the azimuth motor 102, which is the motive force to rotate the main housing 62 of the laser controller 11 about the rotating axis 74. This could be part of a self-contained system, working with the first angle measuring device 82. However, in FIG. 6, it is illustrated as being controlled by the first processing circuit 88, which is necessary to perform the functions that are specified in the logic flow charts.

The second angle measuring device 84 includes a second angle encoder 104, which will provide input signals to the first processing circuit 88, so that it knows exactly in which elevation angle the laser transmitter 96 is arranged in the vertical plane 21. The output signal of the second angle encoder 104 is directed to the first input/output interface circuit 91.

The elevation motor device 85 includes an elevation motor 105 and an elevation motor driver circuit 106. The elevation motor driver circuit 106 will provide the proper current and voltage to drive the elevation motor 105, which is the motive force to pivot the measuring head 61 about the pivoting axis 75.

The leveling motor device 86 includes a leveling motor 107, a leveling sensor 108, and a leveling motor driver circuit 109. The leveling motor driver circuit 109 will provide the proper current and voltage to drive the leveling motor 107. In addition, it receives signals from the leveling sensor 108, and these input signals will determine what types of commands will be sent to the leveling motor 107 from the leveling motor driver circuit 109. If desired, the leveling motor device 86 can be a self-contained system that may not need to communicate with the first processing circuit 88. However, the laser controller 11 will typically desire knowledge of whether or not the laser controller 11 has actually finished its leveling function before the laser controller 11 begins to work in its normal mode of operation. In FIG. 6, the leveling motor device 86 is illustrated as being controlled by the first processing circuit 88.

Figure 7A:
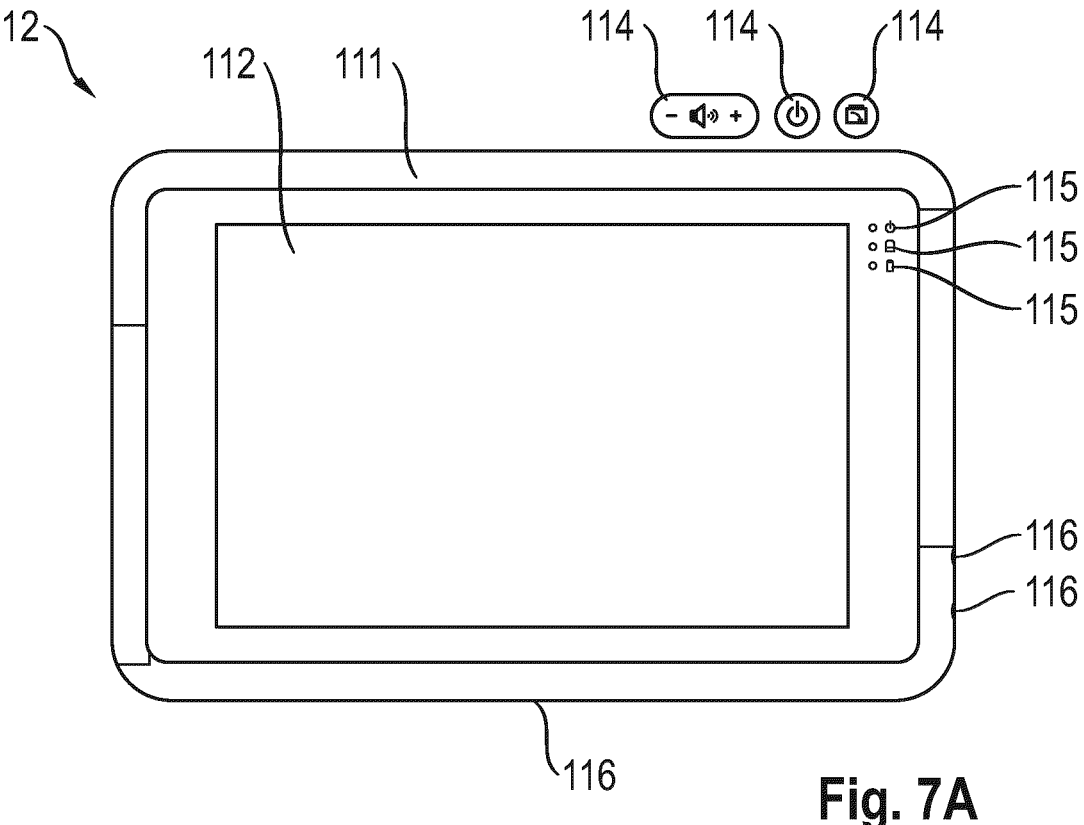
FIGS. 7A, B show an exemplary version of the remote controller of the layout and point transfer system of FIG. 1 in a top view on a front side (FIG. 7A) and in a top view on a rear side (FIG. 7B) of the remote controller.
Figure 7B:
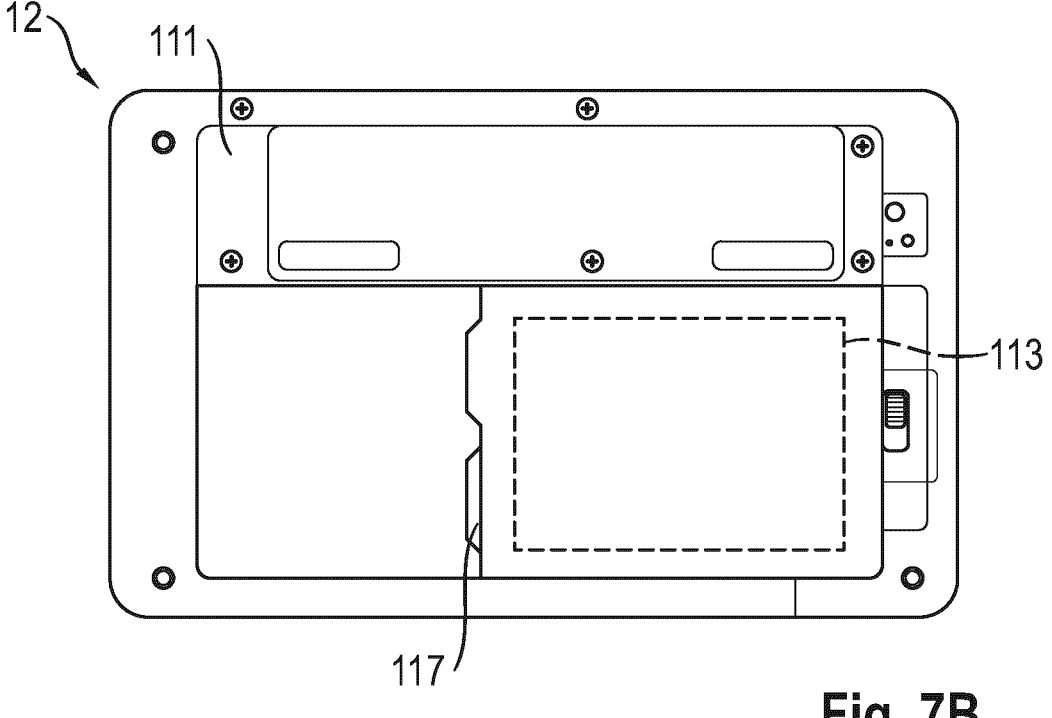

FIGS. 7A, B show an exemplary version of the remote controller 12 in a top view on a front side (FIG. 7A) and in a top view on a rear side (FIG. 7B) of the remote controller 12. The remote controller 12 is designed as tablet computer and includes a housing 111, a touch screen 112, a battery 113, a set of buttons 114, e.g., volume control button, power on/off button, and display control button, a set of indicators 115, e.g., for operating status, data storage status, and battery status, a set of connectors 116, e.g., for docking, data storage, and USB, and a card slot 117.

Figure 8:
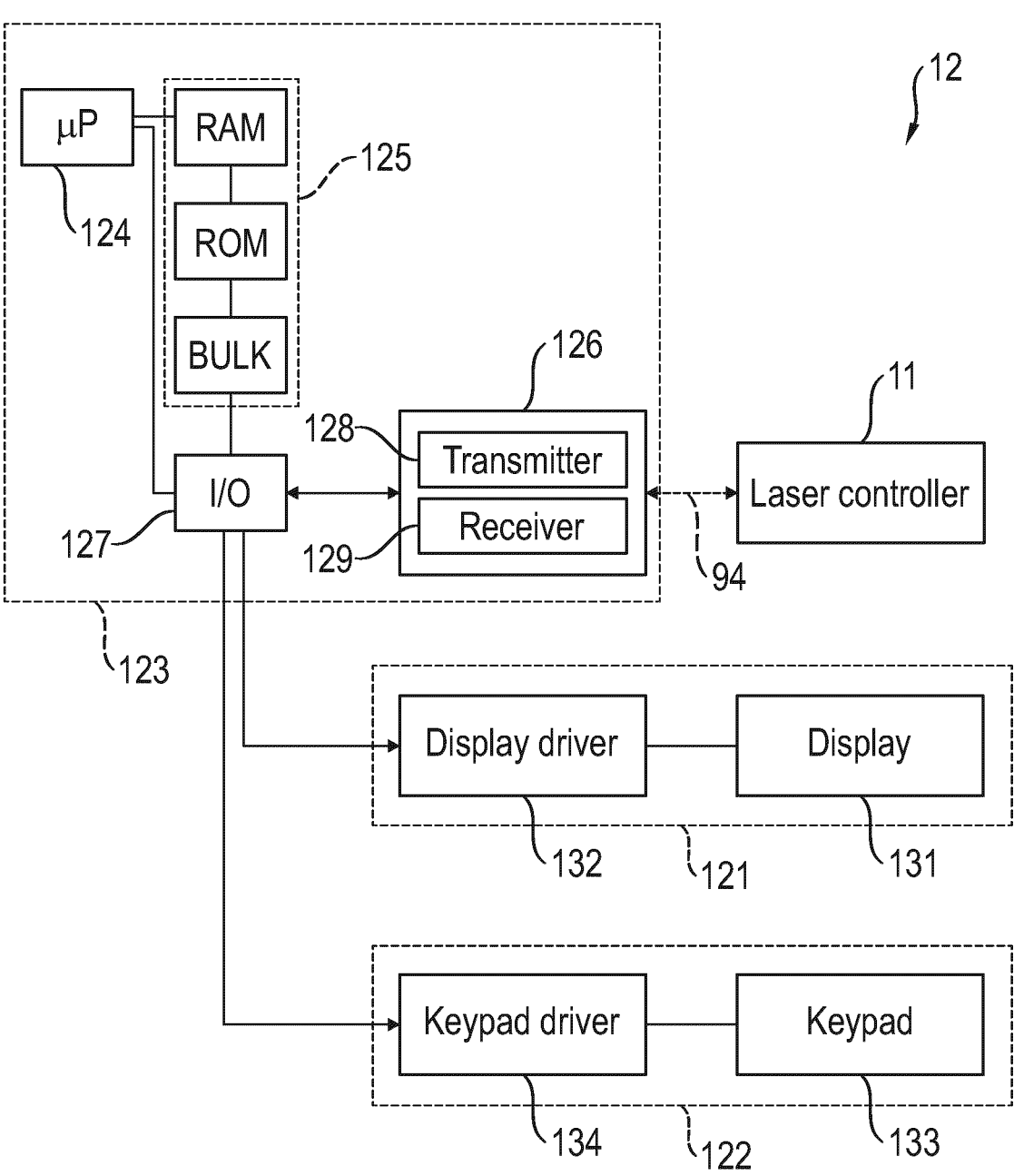
FIG. 8 is a block diagram of the main components of the remote controller as illustrated in FIGS. 7A, B and used in the layout and point transfer system of FIG. 1.

FIG. 8 shows a block diagram of the remote controller 12 used in the layout and point transfer system 10 illustrated in FIG. 1. The remote controller 12 includes a display device 121, a user-operated input device 122, and a second electronic device 123, which comprises a second processing circuit 124, a second memory circuit 125, a second communications circuit 126, and a second input/output (I/O) interface circuit 127.

The second memory circuit 125 may include associated random-access memory (RAM), read only memory (ROM), and some type of bulk memory (BULK); the bulk memory could be a SD card that can plug in the card slot 117 or an external memory device that can plug into the remote controller 12 via one of the connectors 116, e.g., a USB connector. The second processing circuit 124 will communicate with the second memory circuit 125 and the second communications circuit 126 by use of a bus, which would normally carry data signals or address signals, and other types of microprocessor signals, such as interrupts.

The second I/O interface circuit 127 will be in communication with the second communications circuit 126, which includes a second transmitter circuit 128 and a second receiver circuit 129. The second communications circuit 126 is designed to communicate with the laser controller 11, typically using a wireless signal via the communication link 94. In the layout and point transfer system 10, the laser controller 11 will communicate distance values, azimuth angle values and elevation angle values with the remote controller 12, and those values arrives via the communication link 94 to and from the second communications circuit 126.

The display device 121 includes a display 131 and a display driver circuit 132. The display driver circuit 132 will be in communication with the second I/O interface circuit 127 and provides the correct interface and data signals for the display 131. If the remote controller 12 is a laptop computer, for example, then this would be the standard display seen in most laptop computers. Or, if the remote controller 12 is a tablet computer or a smart phone, in which case the display device is a much smaller physical device, the display device 121 could be a touch screen display.

The user-operated input device 122 includes a keypad 133 and a keypad driver circuit 134. The keypad driver circuit 134 will be in communication with the second I/O interface circuit 127 and controls the signals that interface to the keypad 133. If the display device 121 is a touch screen display, then there may not be a separate keypad on the remote controller 12, because most of the command or data to input functions will be available by touching the display itself and the keypad is integrated in the touch screen display. There may be some type of power on/off button, but that would not necessarily be considered a true keypad and would not be used for entering data.

Figure 9A:
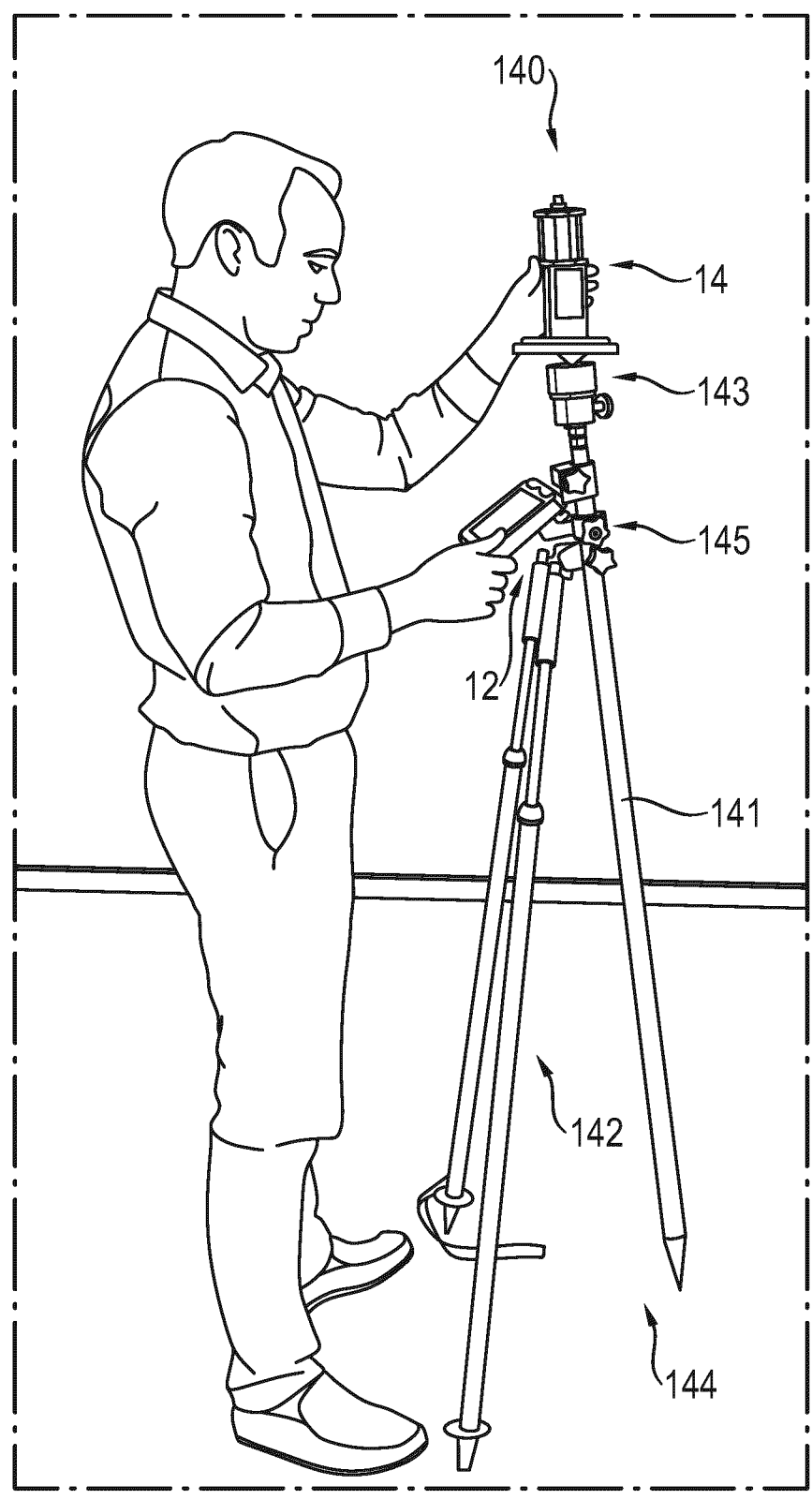
FIGS. 9A, B show a second embodiment of a layout accessory including the target and plumbing system of FIG. 1, a pole, a bipod device, and a connecting unit.

FIG. 9A shows a second embodiment of a layout accessory 140 that is adapted for layouting points of interest on the floor 17 and/or on the ceiling 30. The layout accessory 140 can be used in the layout and point transfer system 10 of FIG. 1A and substitute the layout accessory 13.

The layout accessory 140 includes the target and plumbing system 14 of FIG. 1, a pole 141, a bipod device 142, and a connecting unit 143 that is designed to connect the target and plumbing system 14 to the pole 141. The target and plumbing system 14 is connected via the connecting unit 143 to the pole 141 and the bipod device 142 is mounted to the pole 141. The pole 141 and bipod device 142 are designed as portable chassis 144 for the target and plumbing system 14. The bipod device 142 is used to arrange the layout accessory 140 in a stable and substantially leveled position.

The pole 141 is arranged in an inclined position with the bipod device 142 attached to the inclined pole 141. The orientation of the target and plumbing system 14 can be adjusted via the connecting unit 143, which can include a spherical head allowing that the target and plumbing system 14 is substantially level. The remote controller 12 may be attached to the pole 141 via a bracket element 145, which is preferably attached to the pole 141 at a height such that the user can handle the target and plumbing system 14 and check the display 131 of the remote controller 12.

Figure 9B:
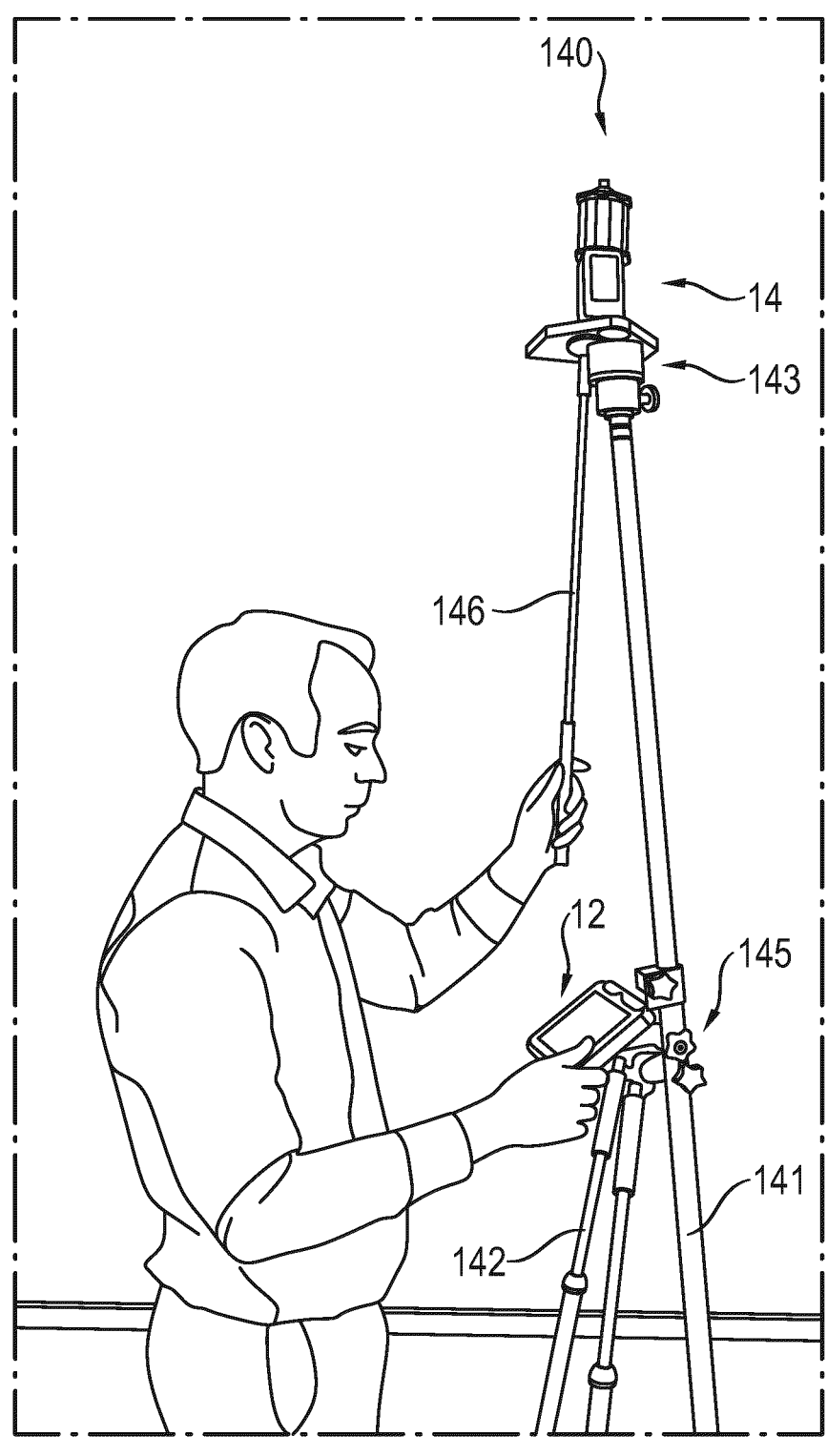

FIG. 9B shows the second layout accessory 140 of FIG. 9A adapted for layouting points of interest on the ceiling 30. To layout points of interest on the ceiling 30, the pole 141 is extended to its maximum length. In the extended position of the pole 141, the target and plumbing system 14 is no longer operable by the user. To operate the target and plumbing system 14, the positioning device 34 may be connected to an operating element 146 that can be operated by the user.

The operating element 146 allows to arrange the target and plumbing system 14 in a height such that the line-of-sight 58 between the laser controller 11 and the reflective target 31 may not be interrupted by material and/or tools stored on the jobsite or by users working on the jobsite; the distance measuring can be performed with high accuracy.

Figure 10:
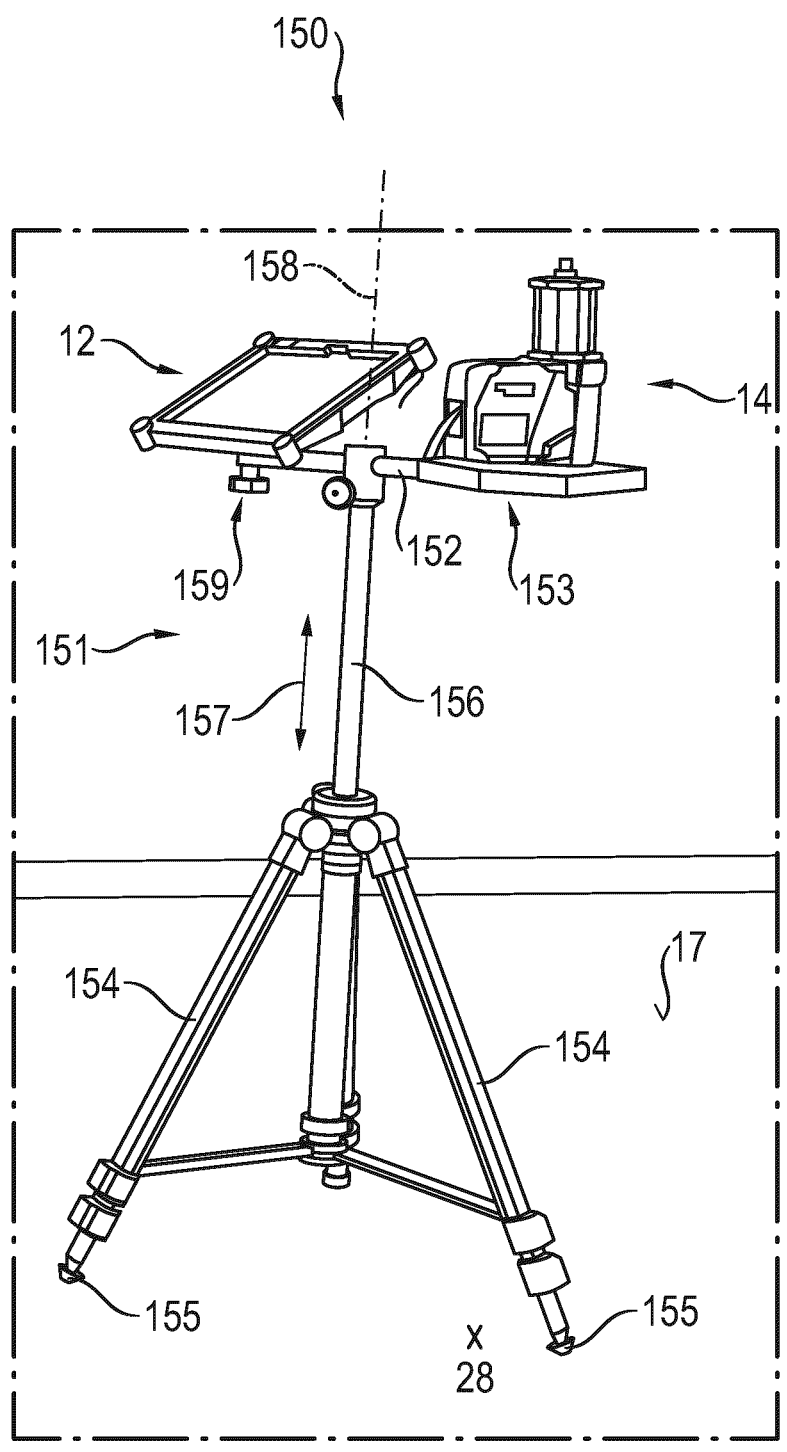
FIG. 10 shows a third embodiment of a layout accessory including the target and plumbing system of FIG. 1, a tripod device, and a connecting unit.

FIG. 10 shows a third embodiment of a layout accessory 150 that is adapted for layouting points of interest on the floor 17 and/or on the ceiling 30. The layout accessory 150 can be used in the layout and point transfer system 10 of FIG. 1A and substitute the layout accessory 13.

The layout accessory 150 includes the target and plumbing system 14, a tripod device 151, an extension arm 152, and a connecting unit 153. The tripod device 151 is designed as movable chassis for the target and plumbing system 14 and includes three legs 154, which may be adjusted in length, three sliding elements 155, which allow to slide the layout accessory 150 over the floor 17, and a central rod 156, which may be adjusted along a height direction 157. In FIG. 10, the central rod 156 is arranged in its highest position with respect to a head of the tripod device 151. The target and plumbing system 14 can be placed via the tripod device 151 at whatever height is needed dependent on the conditions of the jobsite between a minimum position and a maximum position.

The target and plumbing system 14 and the remote controller 12 are mounted on proximal ends of the extension arm 152, which is pivotable about a pivoting axis 158. The remote controller 12 can be mounted via a bracket element 159 to the extension arm 152, wherein the position of the bracket element 159 may be shifted along the extension arm 152. The extension arm 152 allows to balance the target and plumbing system 14 and the remote controller 12.

Figure 11:
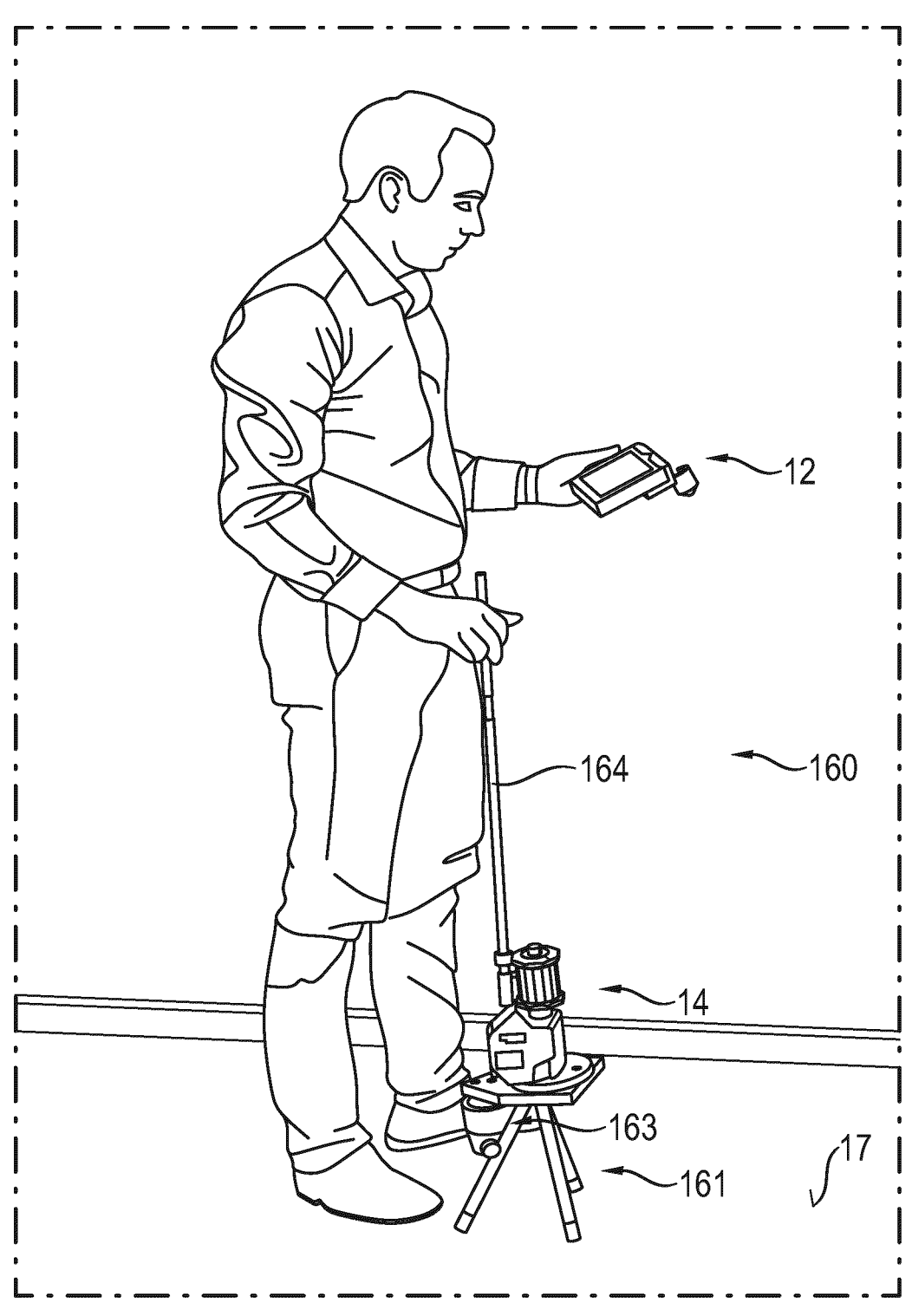
FIG. 11 shows a fourth embodiment of a layout accessory including the target and plumbing system of FIG. 1, a mini tripod device, and a connecting unit.

FIG. 11 shows a fourth embodiment of a layout accessory 160 that is adapted for layouting points of interest on the floor 17. The layout accessory 160 can be used in the layout and point transfer system 10 of FIG. 1A and substitute the layout accessory 13 when point of interests should be transferred to the floor 17.

The layout accessory 160 includes the target and plumbing system 14, a mini tripod device 161, and a connecting unit 163 that allows to connect the target and plumbing system 14 to the mini tripod device 161. The mini tripod device 161 is designed as portable chassis for the target and plumbing system 14.

Compared to chassis such as the tripod device 15, the mini tripod device 161 has a light and compact design and is easy to handle and to transport. Furthermore, the mini tripod device 161 is advantageous during layouting on moving working floors, e.g., metal deck. Arranging the target and plumbing system 14 closer to the floor 17 is preferred when the working floor is moving (e.g., metal deck) because to the same angular swing the opposite length (swinging projection of the floor) is directly proportional to the adjacent length (height of the pivot to the floor).

To improve the handling of the mini tripod device 161, the target and plumbing system 14 is connected to an operating element 164. To layout a point of interest, the user carries the layout accessory 160 by the operating element 164. He moves the layout accessory 160 towards the point of interest until the first and second deviation between the laser controller 11 and the target and plumbing system 14 are smaller than the predetermined first limit. The user stops the movement of the layout accessory 160 and arranges it in a stable and substantially leveled position. While monitoring the display 131 of the remote controller 12, the user moves the mobile unit 50 of the target and plumbing system 14 by the operating element 164 relative to the second positioning element 42 until the first and second deviation are smaller than the predetermined second limit.

Figure 12:
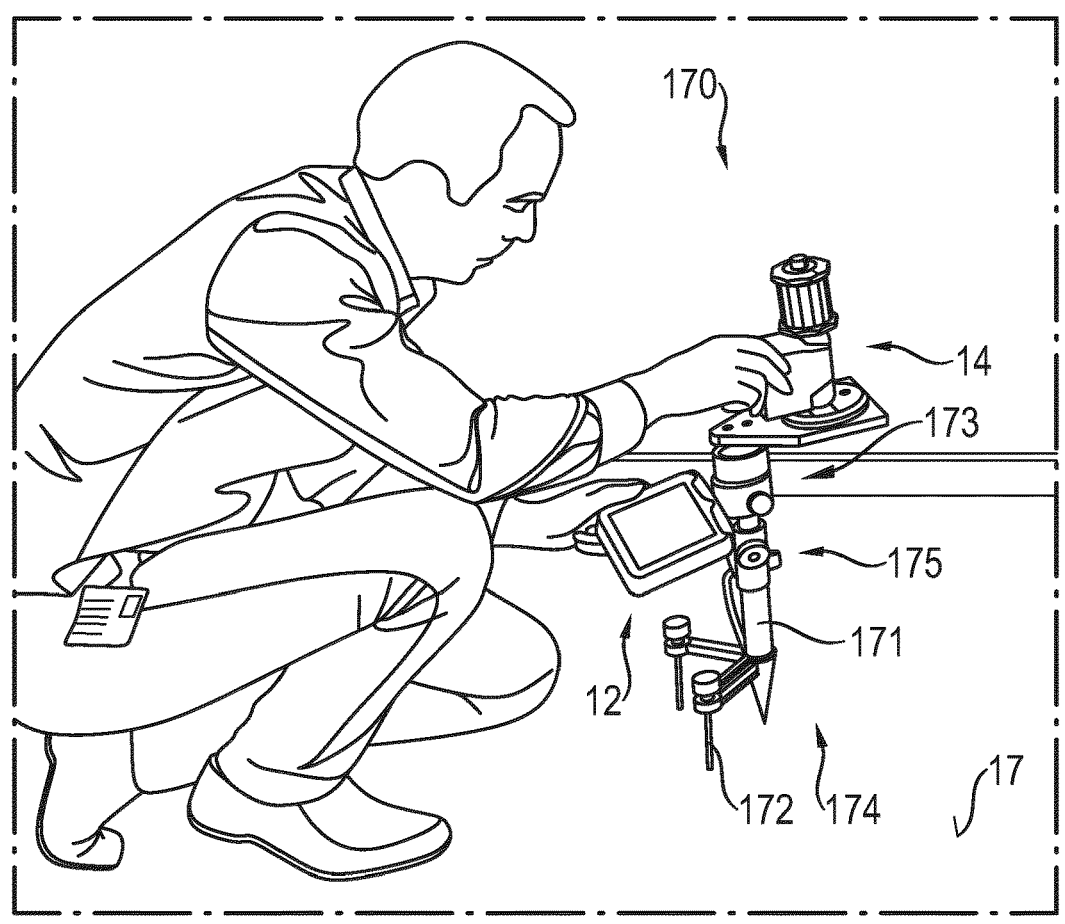
FIG. 12 shows a fifth embodiment of a layout accessory including the target and plumbing system of FIG. 1, a mini pole, a mini bipod device, and a connecting unit.

FIG. 12 shows a fifth embodiment of a layout accessory 170 that is adapted for layouting points of interest on the floor 17. The layout accessory 170 can be used in the layout and point transfer system 10 of FIG. 1A and substitute the layout accessory 13.

The layout accessory 170 includes the target and plumbing system 14, a mini pole 171, a mini bipod device 172, and a connecting unit 173 that allows to connect the target and plumbing system 14 to the mini pole 171. The mini pole 171 and mini bipod device 172 are designed as portable chassis 174 for the target and plumbing system 14. The remote controller 12 may be attached to the mini pole 171 via a bracket element 175, which allows the user to handle the target and plumbing system 14 and to check the display 131 of the remote controller 12.

Figure 13:
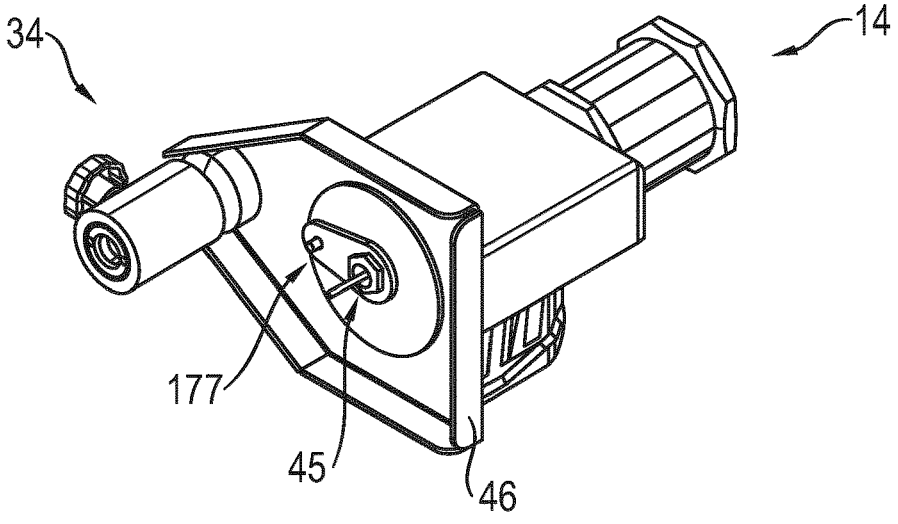
FIG. 13 shows the target and plumbing system of FIG. 1 in a preferred embodiment with a connecting unit to connect the target and plumbing system to a chassis and a modified connecting means to connect an operating element to the target and plumbing system.
Figure 14:
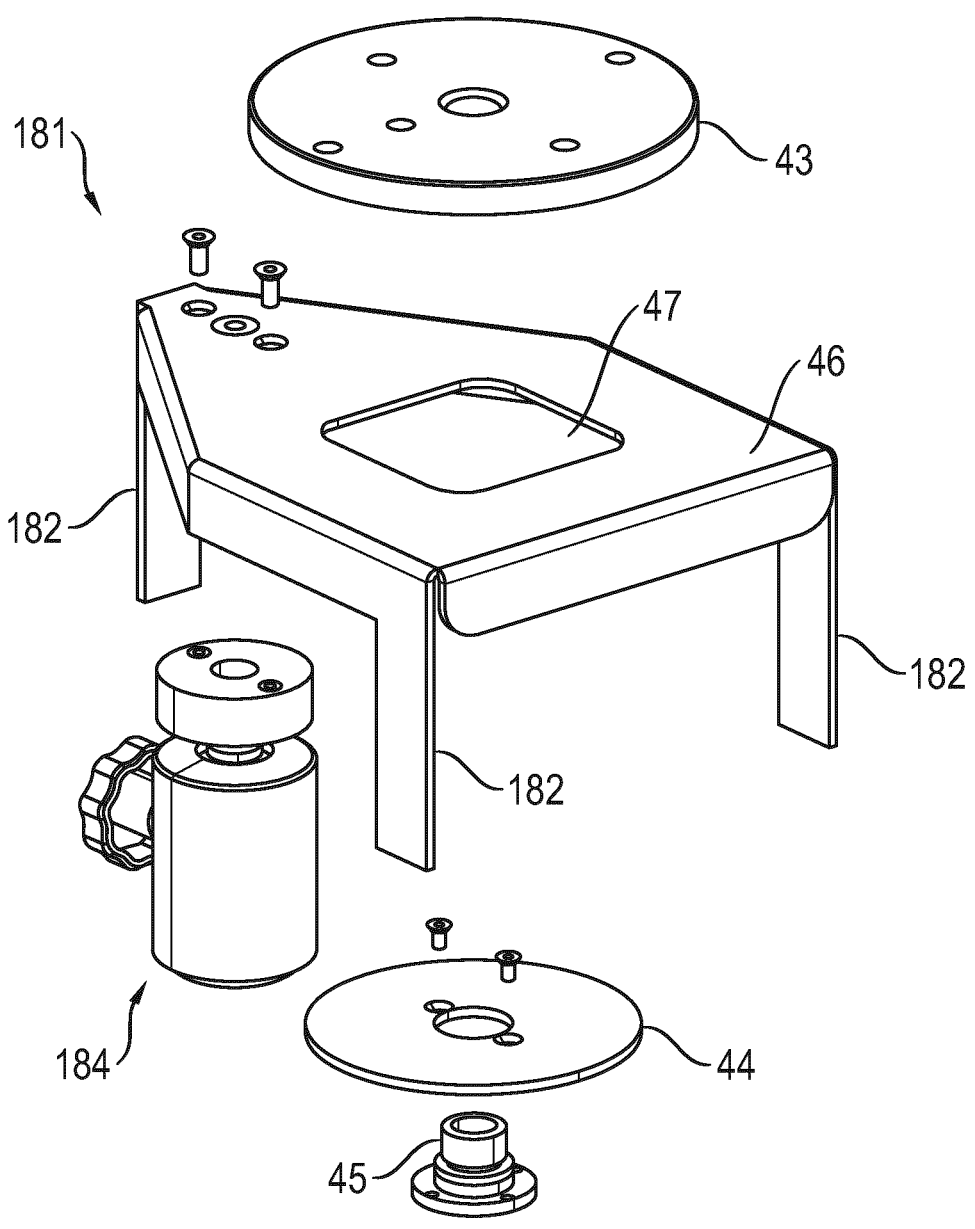
FIG. 14 shows an alternative portable chassis for the target and plumbing system of FIG. 1.

FIG. 13 shows a detail of the target and plumbing system 14. The operating elements 146, 164 must be connected to the mobile unit 50 to allow movement of the mobile unit 50 with respect to the platform 46. FIG. 14 shows a possible design to connect the operating elements 146, 164 to the mobile unit 50. The washer 45B of the connecting means 45 includes an interface 177 which allows to connect the operating element 146 to the first positioning element 41. Alternatively, the operating elements 146, 164 may be connected to the holding device 33 or any other suitable component of the mobile unit 50.

FIG. 14 shows an alternative portable chassis 181 that may substitute the portable chassis 161 of FIG. 11 or the portable chassis 174 of FIG. 12. The portable chassis 181 includes three legs 182 that are integrated with the platform 46 in an integrated compartment 183, which may be fabricated from metal or any other suitable material.

To increase the range of applications the platform 46 may be connected to a connecting unit 184 that may be identical to the connecting unit 27. The connecting unit 184 may include a standard interface, e.g., ⅝ inches thread, to connect the target and plumbing system 14 to a wide range of movable and/or portable chassis.

The invention claimed is:

1. A target and plumbing system (14), comprising:
a reflective target (31) which includes a reflective surface (36);
a self-leveling plumb line laser pointer (32) which emits a plumb line laser beam (37) having a pathway that is in a vertical direction (38), wherein the vertical direction (38) is parallel to a gravitational direction (20);
a holding device (33) which includes a first holding element (39) that assists in holding the reflective target (31) in a defined position and a second holding element (40) that assists in holding the plumb line laser pointer (32) in a defined position; and
a positioning device (34) which includes a first positioning element (41) and a second positioning element (42), wherein the holding device (33) is connected to the first positioning element (41) and the first positioning element (41) is movable with respect to the second positioning element (42);
wherein the second positioning element (42) is a platform (46) including an open space (47) that defines a horizontal two-dimensional area and wherein the first positioning element (41) is movable with respect to the open space (47).

2. The target and plumbing system (14) of claim 1, wherein the first positioning element (41) includes an upper plate element (43), a lower plate element (44), and a connector (45) that connect the upper plate element (43) and the lower plate element (44) and wherein the upper plate element (43) is disposed next to a top side (48A) of the platform (46), the lower plate element (44) is disposed next to a bottom side (48B) of the platform (46), and the connector (45) is disposed at least partially inside the open space (47).

3. The target and plumbing system (14) of claim 1, wherein the first positioning element (41) is rotatable about a rotating axis (51) with respect to the second positioning element (42) and wherein the rotating axis (51) is parallel to the gravitational direction (20).

4. The target and plumbing system (14) of claim 1, further comprising a connecting unit (27; 143; 153; 163; 173; 184) which is connected to the second positioning element (42) and is connectable to a movable and/or portable chassis (15; 144; 151; 161; 174; 181).

5. A movable and/or portable layout accessory (13; 140; 150; 160; 170), comprising:
the target and plumbing system (14) as claimed in claim 1; and
a movable and/or portable chassis (15; 144; 151; 161; 174; 181).

6. The movable and/or portable layout accessory of claim 5, wherein the target and plumbing system (14) is connected to an operating element (145; 164).

7. The movable and/or portable layout accessory of claim 5, wherein the target and plumbing system (14) is mounted to an extension arm (152).

8. A layout and point transfer system (10) to find a predetermined point of interest (POI), comprising:

a laser controller (11) including: (i) a distance measuring device (81) that measures a distance by a measuring beam (18), wherein the measuring beam (18) is rotatable about a first rotating axis (74) and pivotable about a first pivoting axis (75) and wherein the first rotating axis (74) is parallel to a gravitational direction (20) and the first pivoting axis (75) is perpendicular to the gravitational direction (20); (ii) a first angle measuring device (82) that measures an azimuth angle of the measuring beam (18) with respect to a first zero angle in a horizontal plane (19), wherein the horizontal plane (19) is perpendicular to the gravitational direction (20); (iii) a second angle measuring device (84) that measures an elevation angle of the measuring beam (18) with respect to a second zero angle in a vertical plane (21), wherein the vertical plane (21) is parallel to the gravitational direction (20); and (iv) a first processing circuit (88), a first memory circuit (89) including instructions executable by the first processing circuit (88), a first communications circuit (90), and a first input/output interface circuit (91);

a remote controller (12) including: (i) a display device (121); (ii) a user-operated input circuit (122); and (iii) a second processing circuit (124), a second memory circuit (125) including instructions executable by the second processing circuit (124), a second communications circuit (126), and a second input/output interface circuit (127), wherein the laser controller (11) and the remote controller (12) communicate with one another by use of the first communications circuit (90) and second communications circuit (126); and the target and plumbing system (14) as claimed in claim 1, wherein the target and plumbing system (14) further comprises a movable unit (50) including the reflective target (31), the plumb line laser pointer (32), the holding device (33), and the first positioning element (41) and wherein the movable unit (50) is movable with respect to the second positioning element (42);

wherein the first and second processing circuits (88; 124) are configured to:

using the distance measuring device (81), the first angle measuring device (82), and the second angle measuring device (84), measure a current distance value, azimuth angle value, and elevation angle value for the target and plumbing system (14);

using the first processing circuit (88) of the laser controller (11) and/or the second processing circuit (124) of the remote controller (12), calculate a current position of the target and plumbing system (14) from the measured current distance value, azimuth angle value, and elevation angle value and calculate between the current position of the target and plumbing system (14) and the predetermined point of interest (POI) at least a first deviation $(d_1)$ in a first direction (53) and a second deviation $(d_2)$ in a second direction (54), wherein the first direction (53) is coaxially aligned with an intersecting line (56) between the horizontal plane (19) and a vertical plane (57) that runs through a line-of-sight (58) of the laser controller (11) to the target and plumbing system (14) and wherein the second direction (54) is perpendicular to the first direction (53) and disposed in the horizontal plane (19), using the laser controller (11) and/or the remote controller (12), output a visible and/or audible indication that corresponds to the first deviation $(d_1)$ and second deviation $(d_2)$;

while monitoring the visible and/or audible indication, move the target and plumbing system (14) until the first deviation $(d_1)$ and second deviation $(d_2)$ are smaller than a predetermined first limit $(D_1)$;

stop a movement of the target and plumbing system (14) and arrange the target and plumbing system (14) in a stable and substantially leveled position;

while monitoring the visible and/or audible indication, move the movable unit (50) of the target and plumbing system (14) with respect to the second positioning element (42) until the first deviation $(d_1)$ and second deviation $(d_2)$ are zero or at least smaller than a predetermined second limit $(D_2)$, wherein the second limit $(D_2)$ is smaller than the first limit $(D_1)$.

9. The system of claim 8, wherein the plumb line laser pointer (32) is configured to emit the plumb line laser beam (37) and generate a lower plumb point (28) on a floor (17) of a jobsite and/or an upper plumb point (29) on a ceiling (30) of the jobsite.

10. A method for layouting and transferring a point of interest (POI), comprising the steps of:

providing a laser controller (11) which includes: (i) a distance measuring device (81) that measures a distance by a measuring beam (18), wherein the measuring beam (18) is rotatable about a first rotating axis (74) and is pivotable about a first pivoting axis (75) and wherein the first rotating axis (74) is parallel to a gravitational direction (20) and the first pivoting axis (75) is perpendicular to the gravitational direction (20); (ii) a first angle measuring device (82) that measures an azimuth angle of the measuring beam (18) with respect to a first zero angle in a horizontal plane (19), wherein the horizontal plane (19) is perpendicular to the gravitational direction (20); (iii) a second angle measuring device (84) that measures an elevation angle of the measuring beam (18) with respect to a second zero angle in a vertical plane (21), wherein the vertical plane (21) is parallel to the gravitational direction (20); and (iv) a first processing circuit (88), a first memory circuit (89) including instructions executable by the first processing circuit (88), a first communications circuit (90), and a first input/output interface circuit (91);

providing a remote controller (12) which includes: (i) a display device (121); (ii) a user-operated input circuit (122); and (iii) a second processing circuit (124), a second memory circuit (125) including instructions executable by the second processing circuit (124), a second communications circuit (126), and a second input/output interface circuit (127), wherein the laser controller (11) and the remote controller (12) communicate with one another by use of the first communications circuit (90) and second communications circuit (126);

providing the target and plumbing system (14) as claimed in claim 1, wherein the target and plumbing system (14) further comprises a movable unit (50) including the reflective target (31), the plumb line laser pointer (32), the holding device (33), and the first positioning element (41) and wherein the movable unit (50) is movable with respect to the second positioning element (42);

placing the laser controller (11) on a floor (17) of a jobsite in a work area; and finding the predetermined point of interest (POI) by:

using the distance measuring device (81), the first angle measuring device (82) and the second angle measuring device (84), measuring a current distance value, azimuth angle value, and elevation angle value for the target and plumbing system (14);

using the first processing circuit (88) of the laser controller (11) and/or the second processing circuit (124) of the remote controller (12), calculating a current position of the target and plumbing system (14) from the measured current distance value, azimuth angle value, and elevation angle value and calculating between the current position of the target and plumbing system (14) and the predetermined point of interest (POI) at least a first deviation ($d_1$) in a first direction (53) and a second deviation ($d_2$) in a second direction (54), wherein the first direction (53) is coaxially aligned with an intersecting line (56) between the horizontal plane (19) and a vertical plane (57) that runs through a line-of-sight (58) of the laser controller (11) to the target and plumbing system (14) and wherein the second direction (54) is perpendicular to the first direction (53) and disposed in the horizontal plane (19);

using the laser controller (11) and/or the remote controller (12), outputting a visible and/or audible indication that corresponds to the first deviation ($d_1$) and second deviation ($d_2$);

while monitoring the visible and/or audible indication, moving the target and plumbing system (14) until the first deviation ($d_1$) and second deviation ($d_2$) are smaller than a predetermined first limit ($D_1$);

stopping the movement of the target and plumbing system (14) and arranging the target and plumbing system (14) in a stable and leveled position; and while monitoring the visible and/or audible indication, moving the movable unit (50) of the target and plumbing system (14) with respect to the second positioning element (42) until the first deviation ($d_1$) and second deviation ($d_2$) are zero or at least smaller than a predetermined second limit ($D_2$), wherein the second limit ($D_2$) is smaller than the first limit ($D_1$).

11. The method of claim 10, further comprising the steps of:

using the plumb line laser pointer (32), emitting the plumb line laser beam (37) in the vertical direction (38) and generating a lower plumb point (28) on the floor (17) of the jobsite and/or an upper plumb point (29) on a ceiling (30) of the jobsite.

12. The method of claim 11, further comprising the step of:

transferring the lower plumb point (28) on the floor (17) of the jobsite and/or the upper plumb point (29) on the ceiling (30) of the jobsite.

\* \* \* \* \*